(12) United States Patent
Kim et al.

(10) Patent No.: US 12,526,115 B2
(45) Date of Patent: Jan. 13, 2026

(54) METHOD AND DEVICE FOR ACQUIRING CRITICAL UPDATE INFORMATION OF ANOTHER AP IN TRANSMITTING MLD IN WIRELESS LAN SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 18/042,530

(22) PCT Filed: Sep. 9, 2021

(86) PCT No.: PCT/KR2021/012264
§ 371 (c)(1),
(2) Date: Feb. 22, 2023

(87) PCT Pub. No.: WO2022/055268
PCT Pub. Date: Mar. 17, 2022

(65) Prior Publication Data
US 2023/0327836 A1      Oct. 12, 2023

(30) Foreign Application Priority Data

Sep. 11, 2020 (KR) .................. 10-2020-0117060
Sep. 14, 2020 (KR) .................. 10-2020-0117931
(Continued)

(51) Int. Cl.
*H04L 5/00* (2006.01)
*H04W 84/12* (2009.01)

(52) U.S. Cl.
CPC ........... *H04L 5/0053* (2013.01); *H04W 84/12* (2013.01)

(58) Field of Classification Search
CPC .... H04W 5/0053; H04W 84/12; H04W 72/23; H04W 76/15; H04W 28/18
See application file for complete search history.

(56) References Cited

U.S. PATENT DOCUMENTS

2021/0274500 A1* 9/2021 Cariou .................. H04W 48/08

OTHER PUBLICATIONS

PCT International Application No. PCT/KR2021/012264, International Search Report dated Dec. 17, 2021, 2 page.
(Continued)

*Primary Examiner* — Mohammad S Anwar
(74) *Attorney, Agent, or Firm* — LEE, HONG, DEGERMAN, KANG & WAIMEY

(57) ABSTRACT

Proposed are a method and device for acquiring critical update information of an AP in a transmitting MLD, on the basis of a TIM frame, in a wireless LAN system. Specifically, a receiving MLD receives a TIM frame from a transmitting MLD through a first link. The receiving MLD decodes the TIM frame. The transmitting MLD comprises: a first transmitting STA operating in the first link; a second transmitting STA operating in a second link; and a third transmitting STA operating in a third link. The receiving MLD comprises a first receiving STA operating in the first link. The TIM frame comprises a check beacon field and a MLD change sequence field. The check beacon field comprises critical update information of the first transmitting STA. The MLD change sequence field comprises critical update information of the second and third transmitting STAs.

13 Claims, 45 Drawing Sheets

(30) Foreign Application Priority Data

Sep. 18, 2020 (KR) ........................ 10-2020-0120741
Sep. 28, 2020 (KR) ........................ 10-2020-0126006

(56) References Cited

OTHER PUBLICATIONS

Kwon et al., "Multi-Link Tim," IEEE 802.11-20/0066r3, Jan. 2020, 18 pages.
Kwon et al., "MLD Discovery follow up," IEEE 802.11-20/0898r2, May 2020, 16 pages.
Kneckt et al., "AP MLD Beaconing and Discovery," IEEE 802.11-20/865r2, Jul. 2020, 30 pages.
Park et al., "Multi-link TIM—follow up," IEEE 802.11-20/0084r1, Apr. 2020, 11 pages.
Kim et al., "Issues on MLD Power Saving," IEEE 802.11-20/1402r0, Sep. 2020, 15 pages.

* cited by examiner (a)

(b)

PPDU Format (IEEE 802.11a/g)

HT PPDU Format (IEEE 802.11n)

VHT PPDU Format (IEEE 802.11ac)

FIG. 12

| Multi-link STA | | |
|---|---|---|
| 5GHz | 6GHz | |
| STA 1 Link 1 | STA 2 Link 2 | STA 3 Link 3 |

FIG. 14

| Category | EHT Action | Link ID | Change Sequence |

FIG. 15

| Element ID | Length | Change Sequence |
|---|---|---|

Octets: 1      1      1

FIG. 16

| Element ID | Length | Link ID | Change Sequence | Link ID | Change Sequence | ⋮ |

FIG. 17

| Category | EHT Action | MLD Change Sequence Element |

FIG. 18

| Category | Unprotected WNM Action | Check Beacon | Time stamp | TIM Element | MLD Change Sequence Element |

FIG. 19

| Category | Unprotected WNM Action | Link ID | Check Beacon | Time stamp | TIM Element | ... |

FIG. 21

| Category | EHT Action | Link ID | Change Sequence Element |
|---|---|---|---|

FIG. 22

| Category | EHT Action | MLD Change Sequence Element |

FIG. 27

| Category | Unprotected WNM Action | Check Beacon | Time stamp | TIM Element | MLD Change Sequence Element |

FIG. 28

| Category | EHT Action | Link ID | Change Sequence Element | Broadcast Time |

FIG. 29

| Category | EHT Action | MLD Change Sequence Element |

FIG. 30

| Category | EHT Action | Link ID | Change Sequence | Link ID | Change Sequence | ... | Broadcast Time |

FIG. 35

| Category | Unprotected WNM Action | Check Beacon | Time stamp | TIM Element | MLD Change Sequence Element | Broadcast Time |

FIG. 36

| Element ID | Length | Change Sequence Broadcast Interval |

| Element ID | Length | Change Sequence Broadcast Interval | Periodic |

| Element ID | Length | Link 1 | Change Sequence Broadcast Interval | Periodic | Link 2 | ... |

FIG. 39

| Category | EHT Action | Broadcast Change Sequence request Element |
|---|---|---|

FIG. 40

| Element ID | Length | Status | Change Sequence Broadcast Interval (optional) | Change Sequence Broadcast Offset (optional) | High Rate Change Sequence rate (optional) | Low Rate Change Sequence rate (optional) |
|---|---|---|---|---|---|---|

FIG. 41

| Category | EHT Action | Broadcast Change Sequence response Element |

METHOD AND DEVICE FOR ACQUIRING CRITICAL UPDATE INFORMATION OF ANOTHER AP IN TRANSMITTING MLD IN WIRELESS LAN SYSTEM

CROSS-REFERENCE TO RELATED APPLICATION(S)

This application is the National Stage filing under 35 U.S.C. 371 of International Application No. PCT/KR2021/012264, filed on Sep. 9, 2021, which claims the benefit of earlier filing date and right of priority to Korean Application Nos. 10-2020-0117060, filed on Sep. 11, 2020, 10-2020-0117931, filed on Sep. 14, 2020, 10-2020-0120741, filed on Sep. 18, 2020, and 10-2020-0126006, filed on Sep. 28, 2020, the contents of which are all hereby incorporated by reference herein in their entireties.

TECHNICAL FIELD

The present specification relates to a multi-link operation in a wireless LAN system, and more particularly, to a method and apparatus for obtaining critical update information of another AP in a transmitting MLD.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARD) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for obtaining critical update information of another AP in a transmitting MLD in a wireless LAN system.

An example of this specification proposes a method for obtaining critical update information of another AP in a transmitting MLD.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for notifying whether a critical update of another AP in a transmitting MLD is based on a TIM frame in MLD communication. The transmission MLD may be an AP MLD, and the reception MLD may be a non-AP MLD.

A receiving multi-link device (MLD) receives a traffic indication map (TIM) frame from a transmitting MLD through a first link.

The receiving MLD decodes the TIM frame.

For example, the transmitting MLD includes a first transmitting station (STA) operating on the first link, a second transmitting STA operating on a second link and a third transmitting STA operating on a third link. The receiving MLD may include a first receiving STA operating on the first link. The receiving MLD may further include a second receiving STA operating on the second link and a third receiving STA operating on the third link.

The TIM frame includes a Check Beacon field and an MLD Change Sequence field. The check beacon field includes critical update information of the first transmitting STA. The MLD change sequence field includes critical update information of the second and third transmitting STAs.

That is, this embodiment proposes a method of notifying critical update information of an AP and other Aps connected in a transmitting MLD based on a previously defined TIM frame. The previously defined check beacon field in the TIM frame is used to inform critical update information of connected APs, and the newly defined MLD change sequence field is used to inform critical update information of other APs.

According to the embodiment proposed in this specification, since it is assumed that TIM broadcast is activated and the receiving MLD operates in a power saving mode, the receiving STA included in the receiving MLD wakes up according to the cycle of the TIM frame (awake) and does not necessarily need to be awake to receive a beacon frame. Accordingly, when a critical update of another AP occurs after a beacon frame, the receiving STA can receive critical update information of another AP through the TIM frame without receiving the next beacon frame. This has an effect of reducing overall frame overhead and performing efficient power saving.

BRIEF DESCRIPTION OF THE DRAWINGS

FIG. 12 shows an example of a structure of a non-AP MLD.

FIG. 14 shows an example of a CS Frame format.

FIG. 15 shows an example of a change sequence element format in the existing standard.

FIG. 16 shows an example of an MLD Change sequence element format.

FIG. 17 shows another example of a CS Frame format.

FIG. 18 shows a TIM Frame format according to this embodiment.

FIG. 19 is another example of a TIM Frame format.

FIG. 21 is an example of a CS Frame format used in Broadcast Change Sequence method 1.

FIG. 22 is another example of a CS Frame format used in Broadcast Change Sequence method 1.

FIG. 26b shows a change sequence value included in the beacon frame and CS frame of FIG. 26a.

FIG. 27 is an example of a TIM Frame format used in Broadcast Change Sequence method 1.

FIG. 28 is an example of a CS Frame format used in Broadcast Change Sequence method 2.

FIG. 29 is another example of a CS Frame format used in Broadcast Change Sequence method 2.

FIG. 30 is an example of MLD Change Sequence Element used in Broadcast Change Sequence method 2.

FIG. 34b shows a change sequence value and broadcast time included in the beacon frame and CS frame of FIG. 34a.

FIG. 35 shows an example of a TIM Frame format for Broadcast Change sequence method 2.

FIG. 36 shows an example of a Broadcast Change sequence request element format.

FIG. 37 shows another example of a Broadcast Change sequence request element format.

FIG. 38 shows another example of a Broadcast Change sequence request element format.

FIG. 39 shows an example of a Broadcast Change sequence Request frame format.

FIG. 40 shows an example of a broadcast change sequence response element format.

FIG. 41 shows an example of a Broadcast Change sequence Response frame format.

DETAILED DESCRIPTION

Figure 1:
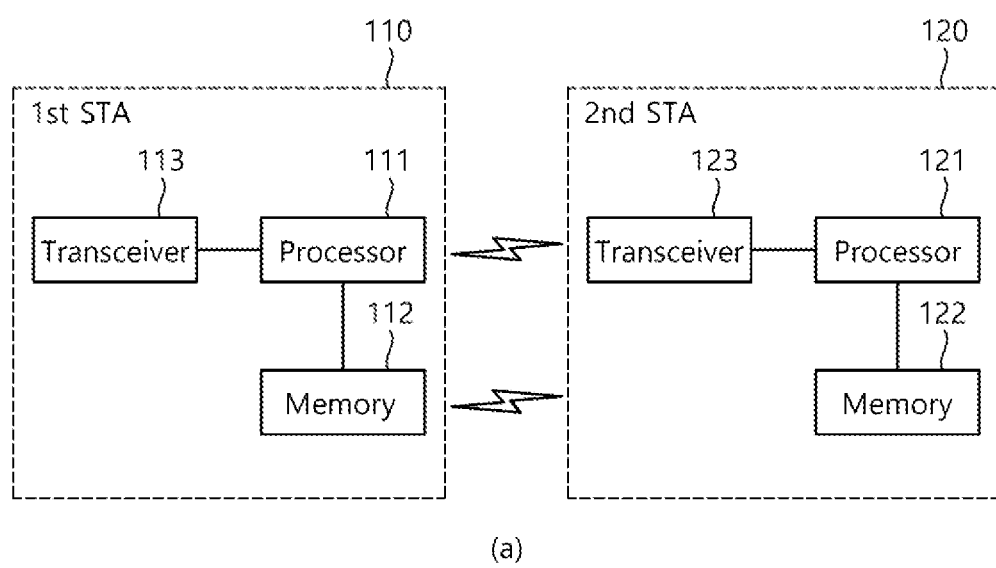
FIG. 1 shows an example of a transmitting apparatus and/or receiving apparatus of the present specification.
Figure 1:
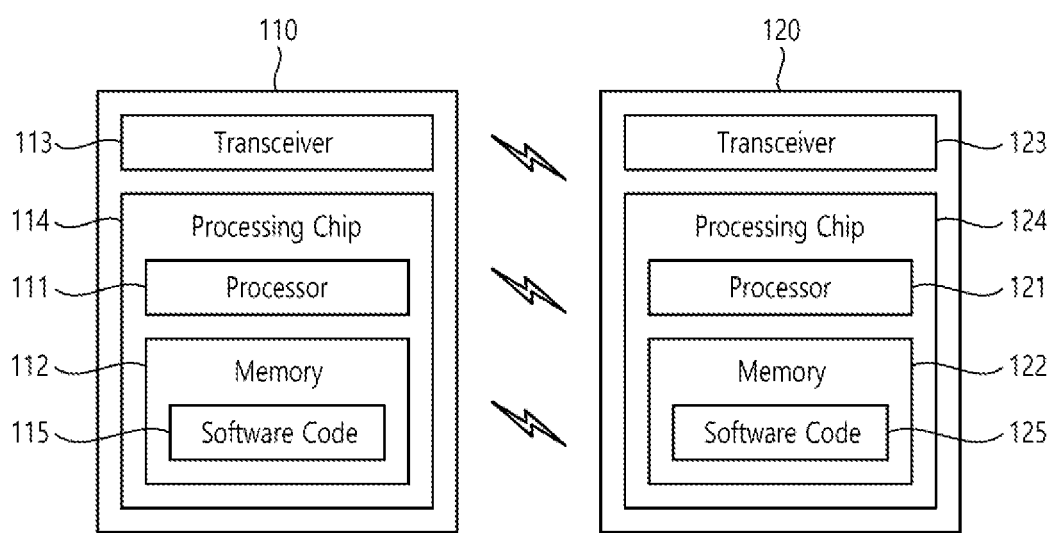

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
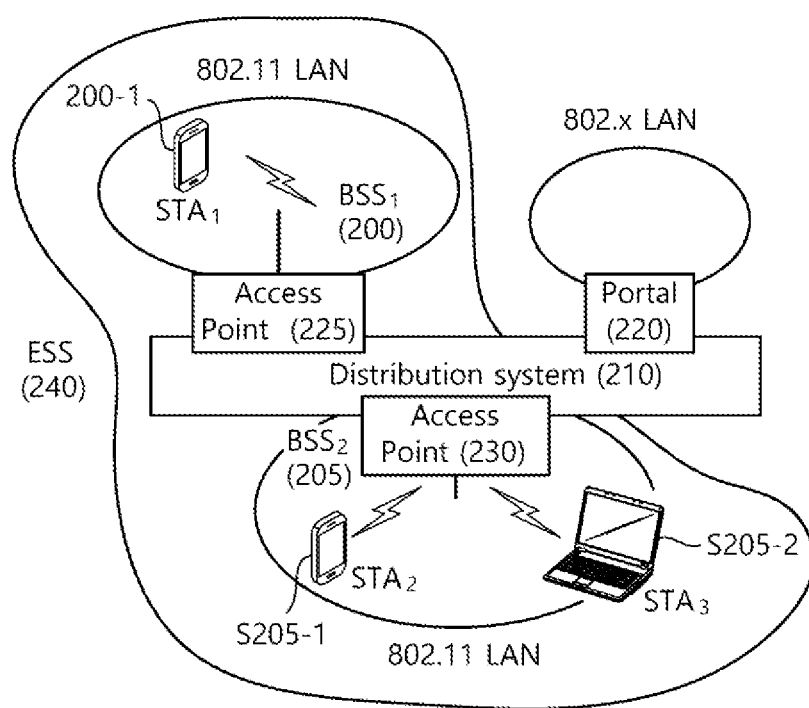
FIG. 2 is a conceptual view illustrating the structure of a wireless local area network (WLAN).
Figure 2:
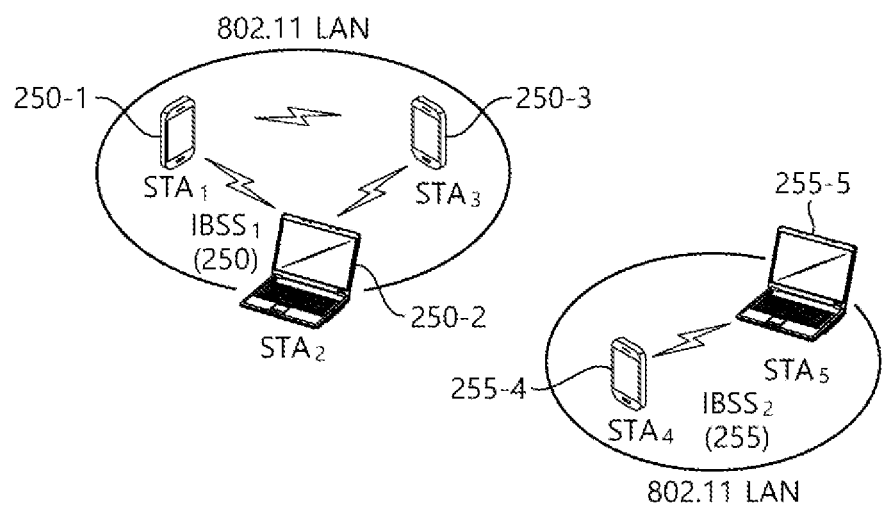

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the MSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
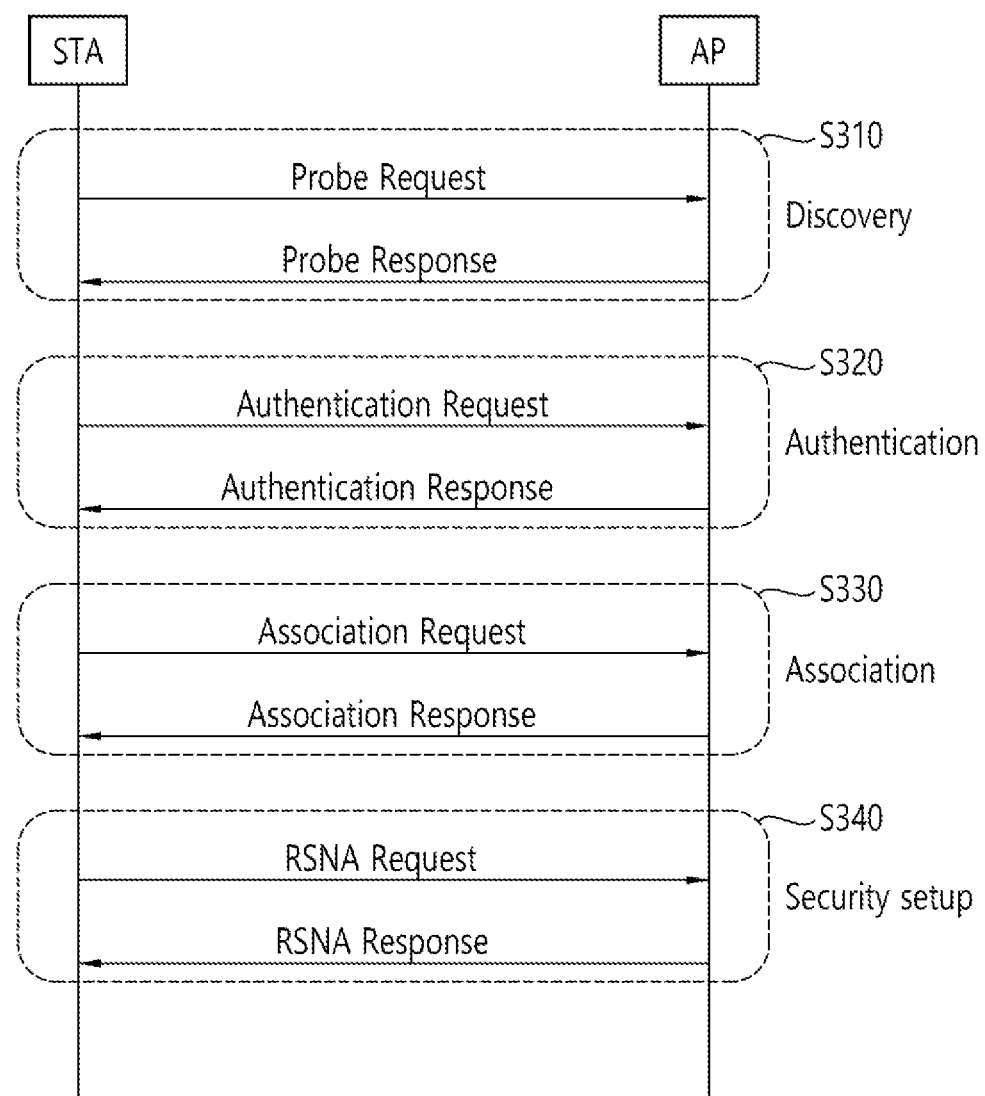
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IB SS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
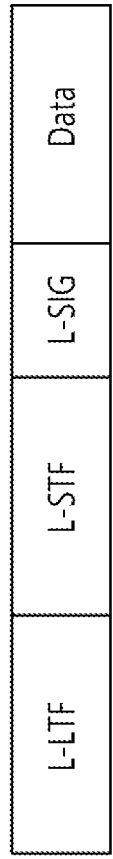
FIG. 4 illustrates an example of a PPDU used in an IEEE standard.
Figure 4:
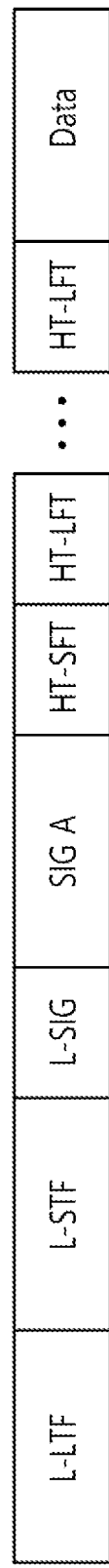
Figure 4:
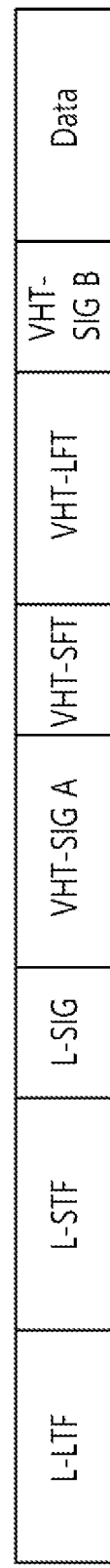
Figure 4:
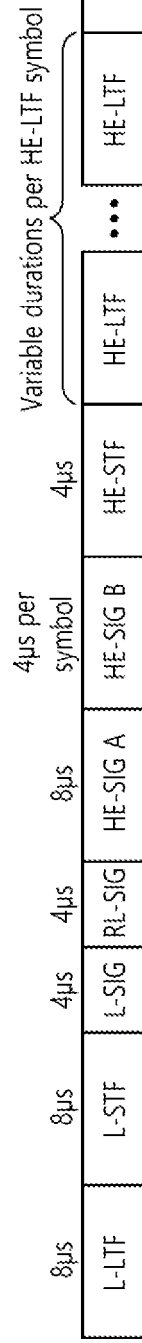

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
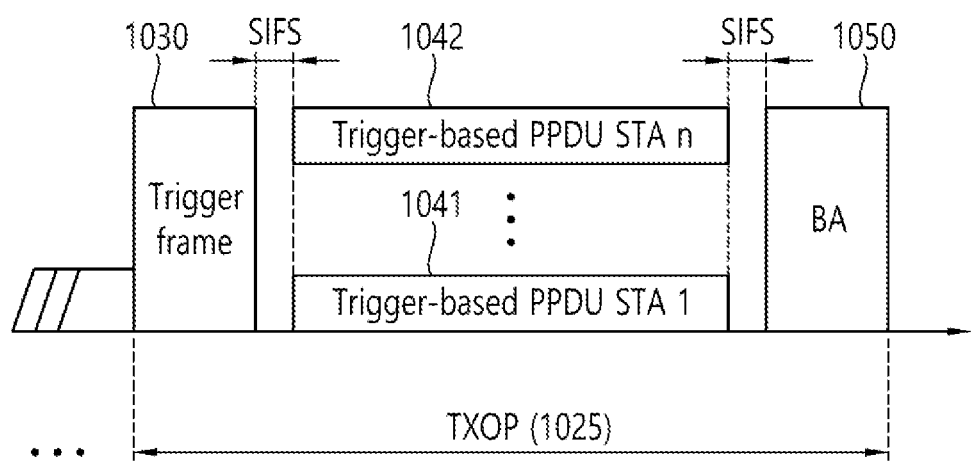
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
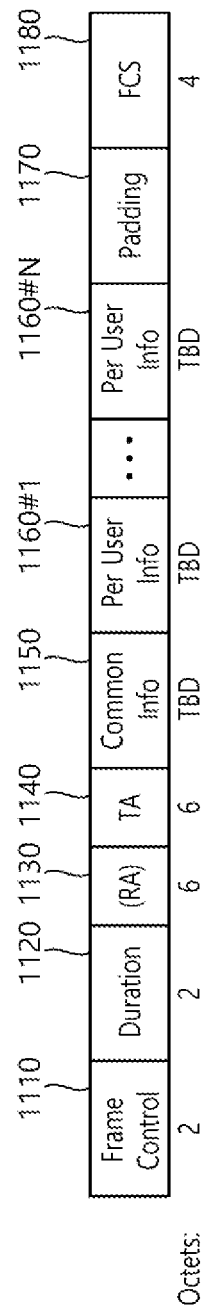
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160#1 to 1160#N shown in FIG. 6 may include a plurality of subfields.

Figure 7:
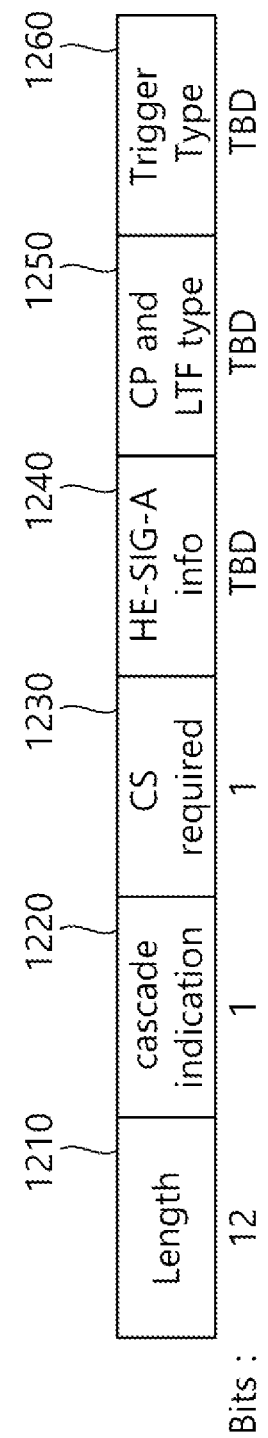
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
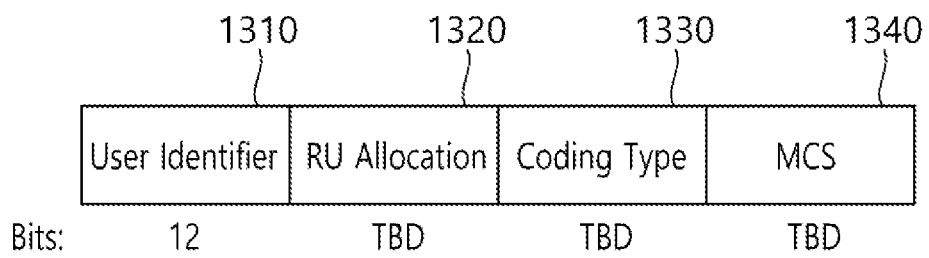
FIG. 8 illustrates an example of a subfield included in a per user information field.

FIG. 8 illustrates an example of a subfield included in a per user information field. A user information field 1300 of FIG. 8 may be understood as any one of the per user information fields 1160#1 to 1160#N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
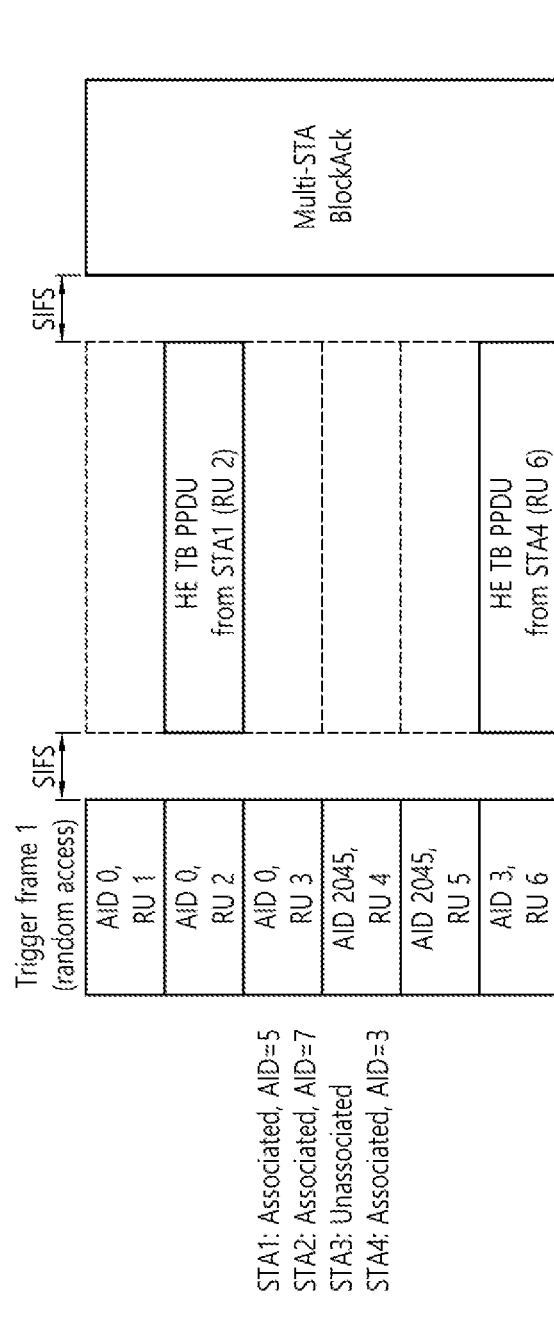
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
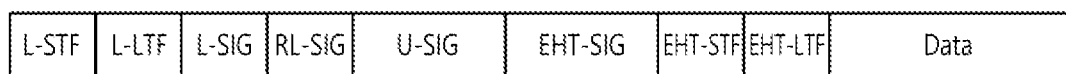
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
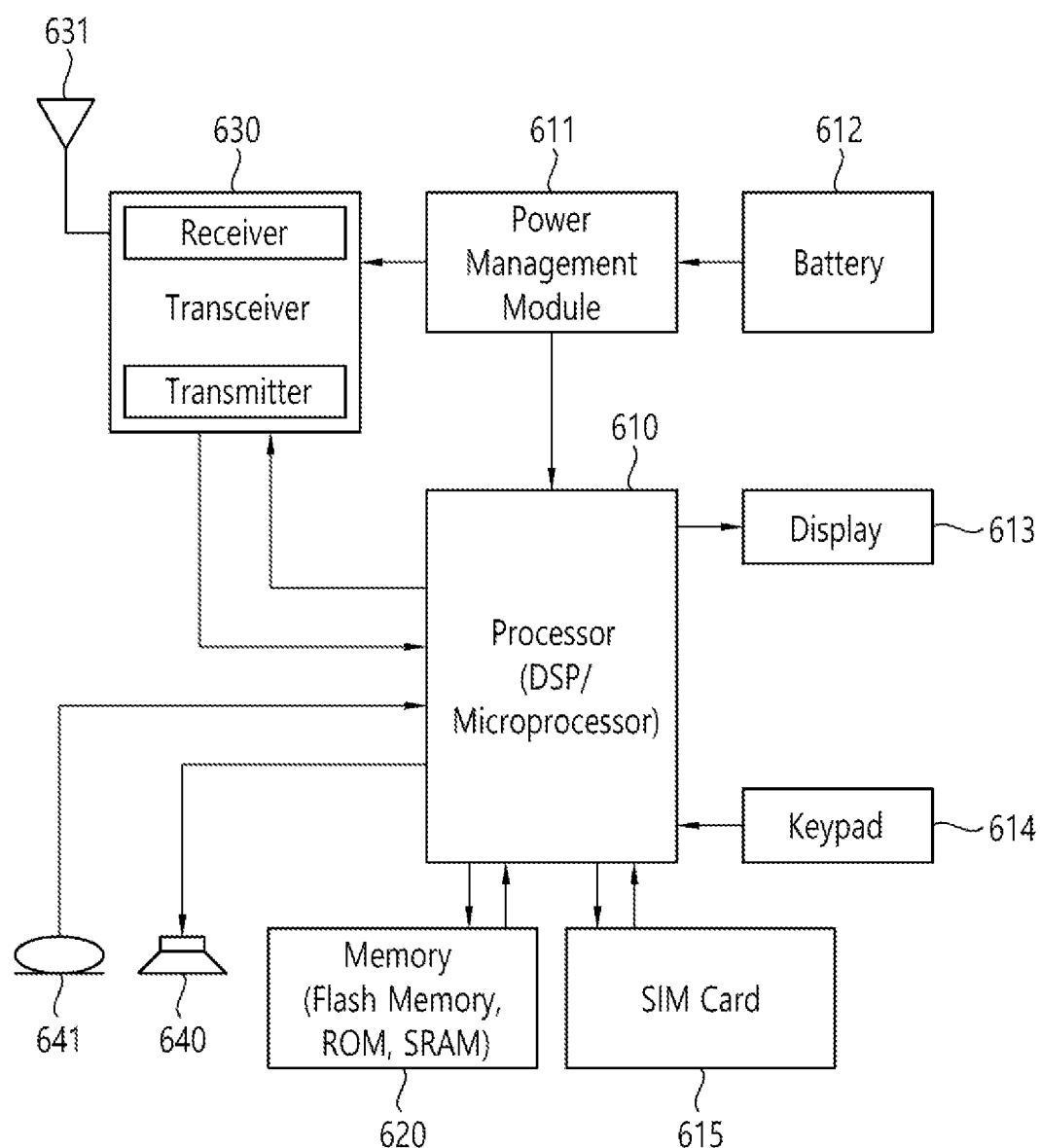
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto. As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

FIG. 12 shows an example of a structure of a non-AP MLD.

Referring to FIG. 12, a non-AP MLD may be configured with a plurality of links. In other words, a non-AP MLD can support multiple links. A non-AP MLD may include a plurality of STAs. A plurality of STAs may have Link for each STA. Although FIG. 12 shows an example of a non-AP MLD structure, the structure of the AP MLD may also be configured identically to the example of the structure of the non-AP MLD shown in FIG. 12.

For example, the non-AP MLD may include STA 1, STA 2, and STA 3. STA 1 can operate on link 1. link 1 may be included in the 5 GHz band. STA 2 can operate on link 2. link 2 may be included in the 6 GHz band. STA 3 can operate on link 3. link 3 may be included in the 6 GHz band. Bands included in link 1/2/3 are exemplary and may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link can be changed or reconnected to another link by AP MLD or non-AP MLD depending on the situation.

In addition, in the EHT standard, a link may be classified as an anchored link or a non-anchored link in order to reduce power consumption. An anchored link or non-anchored link can be called variously. For example, an anchored link may be referred to as a primary link. A non-Anchored Link can be called a Secondary link.

According to an embodiment, an AP MLD supporting multi-link can be managed by designating each link as an anchored link or a non-anchored link. The AP MLD may support one or more links among a plurality of links as an anchored link. A non-AP MLD can use it by selecting one or more of its own anchored links from the Anchored Link List (list of anchored links supported by the AP MLD).

For example, Anchored Link can be used for non-data frame exchange (i.e. Beacon and Management frame) as well as frame exchange for synchronization. Also, non-anchored links can only be used for data frame exchange.

The non-AP MLD can monitor only the anchored link for receiving beacons and management frames during the idle period. Therefore, in the case of non-AP MLD, at least one anchored link must be connected to receive beacon and management frame. The one or more Anchored Links must always maintain an enable state. In contrast, non-anchored links are used only for data frame exchange. Accordingly, an STA corresponding to a non-anchored link (or an STA connected to a non-anchored link) may enter doze during an idle period not using a channel/link. This has the effect of reducing power consumption.

Therefore, in the following specification, a protocol for recommending or requesting link reconnection by an AP MLD or a non-AP MLD dynamically according to circumstances may be proposed for efficient link connection. In addition, in the following specification, an anchored link reconnection protocol considering characteristics of an anchored link used for the purpose of power reduction as well as a general link may be additionally proposed.

Example for Link Change and Reconnection

According to an embodiment, each link between an AP MLD and a non-AP MLD may be determined in an Association or (re)Association process. At this time, the AP MLD and the non-AP MLD can perform frame exchange through the connected Link. A specific embodiment in which an AP MLD and a non-AP MLD are connected through a link setup process can be described with reference to FIG. 13.

Figure 13:
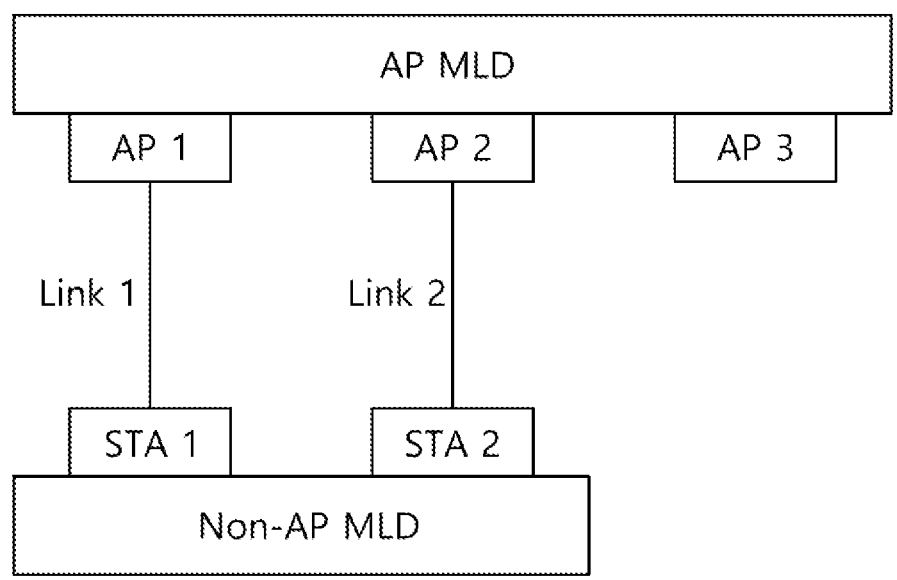
FIG. 13 illustrates an example in which an AP MLD and a non-AP MLD are connected through a link setup process.

FIG. 13 illustrates an example in which an AP MLD and a non-AP MLD are connected through a link setup process.

Referring to FIG. 13, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. For another example, AP MLD and non-AP MLD may be connected through a one-time link setup process. In other words, the AP MLD and the non-AP MLD may be connected through link 1 and link 2 based on a link setup process once.

As described above, each AP and STA may perform frame exchange through the connected Link. In addition, information of other APs on a different link or other STAs on a different link may be transmitted and received through one link.

This characteristic can be usefully used when the non-AP MLD is in Power Saving (PS) mode. In general, in order for the AP MLD to deliver information to STA 2, Link 2 must be used, but it can be delivered to STA 2 through Link 1 through cross-link signaling. However, for this purpose, information sharing capability capable of sharing information between STAs of non-AP MLD is required.

At this time, if STA 2 of the non-AP MLD enters the doze state due to PS mode, if there is information to be transmitted by AP 2, it can be transmitted through Link 1 without waking STA 2 through cross-link signaling.

Based on the above definitions, the present specification proposes a method of notifying the EHT non-AP STA when a change in critical information of the EHT AP occurs (ie, when a critical update occurs). For reference, the IEEE 802.11 standard defines a critical update as a case in which system information is changed in the BSS. However, the critical update mentioned in this specification may include updates of various information that may be important to the STA when transmitting data in multi-link, such as STR capability, in addition to system information defined in the current standard, and is not limited to only system information.

In general, an STA may obtain critical update information of an AP through a beacon frame periodically transmitted from the AP. Currently, in 802.11be, by utilizing the characteristics of multi-link, non-AP STAs change sequence number information (ie, change sequence element or field) was reflected. In order to avoid the beacon bloating issue, for APs other than peer APs among APs included in the AP MLD, if it is notified by including only whether the critical update information has changed (ie, CSN (Change Sequence Number) value), upon receiving this, the non-AP MLD checks the change through the change sequence field value and receives a beacon for the changed link. (For this purpose, the non-AP MLD can know whether the CSN value received from the beacon is an updated value by remembering the current change sequence number.) If it is confirmed that the critical update of the peer AP of the STA in the doze state has been changed due to the PS mode, the STA is awakened and the next beacon is received to confirm the updated information.

This method can be useful in avoiding beacon bloating issues in an 802.11be environment supporting multi-link. However, this method may not be sufficient for a device supporting an ultra-power saving mode.

In 802.11be, since all STAs of a non-AP MLD do not need to receive a beacon, when the AP MLD broadcasts the corresponding critical update change information, some STAs may miss the corresponding information for some reason (For example, data missing due to the doze state of PS mode, data loss due to interference, etc.). Here, the critical update information is classified as a critical update list because it is very critical information that must be quickly delivered to the STA.

Therefore, in the present specification, an announcement method for increasing transmission probability of information on such a critical update to an EHT STA in 802.11be is proposed.

1.1 Broadcast Change Sequence Method

Section 1.1 proposes a method of broadcasting such information to STAs in an announcement frame other than a beacon frame when a critical update occurs for an AP of the AP MLD. The proposed method broadcasts updated change sequence information to notify the EHT STA when a critical update occurs for some APs included in the AP MLD. And, even if the STA misses some beacons, it can receive critical update change or not through an announcement frame. In addition, the proposed method is a frame containing only information about critical update other than beacon, and has less overhead than beacon, so it can reduce the awake duration for STAs operating in PS mode. Section 1.1 defines the elements included in the announcement frame, Section 1.2 describes the operation process of the announcement method, and Section 1.3 proposes signaling to activate this operation.

The broadcast method proposed in this specification is a method for notifying information about critical updates of the STA's connection AP (ie, peer AP) and other APs of the same AP MLD. If there is information to be used, it can be applied and used for other information. This specification proposes a mechanism for transmitting information of other APs of the same AP MLD as well as the connected AP when there is critical information to be delivered from the AP to the STA, and may be applied and used in various cases.

Information announced upon change in the BSS through this method relates to information that the STA wants to receive transmission or must be transmitted to the STA, and may be included in various ways according to the definition of the standard. Therefore, if there is information to be delivered other than change sequence information, it can be added and delivered in the form of an element in an announcement frame (e.g. CS Frame, (Broadcast) Probe response, TIM Frame, etc.) to be transmitted.

1.1.1 CS (Change Sequence) Frame

In the present specification, a method for an AP to notify critical update through an announcement frame other than a beacon is proposed. In this specification, the announcement frame is defined as a CS (Change Sequence) frame to support the announcement method (however, the specific name may change later), and the TIM (Traffic Indication Map) frame defined in the existing standard may be used. The main elements and fields included in CS Frame or TIM Frame are as follows. Depending on the proposed method, the fields defined below may be optionally supported or omitted. In addition, if necessary, various information (e.g. Operation element, Capability information, etc.) in addition to the fields below may be added and delivered to the STA together.

1) Link identifier: Link indicator (e.g. Link ID, BSS ID). Information for notifying the STA of which AP's critical update has occurred.

2) Change Sequence: Information to indicate whether to update critical update information, and the information version is displayed as an integer. The STA may store the change sequence number and compare it with a newly received change sequence number to check whether a critical update has been updated and a version of information.

3) Broadcast Time: Time information at which the AP announces updated critical update information. The AP may notify in advance when to announce the critical update information so that the STA that needs to receive changed information does not miss the corresponding information. This can prevent the STA that has entered the doze state by operating in the PS mode from missing the corresponding information.

Based on the above definitions, an embodiment of the CS Frame format is as follows.

FIG. 14 shows an example of a CS Frame format.

If a CS frame is defined as an action frame in a broadcast CS method, it may have a form as shown in FIG. 14. In order to define the action for the EHT STA, it is assumed that the 'EHT Action' field is defined in the Category and the Broadcast CS action is defined therein.

Referring to FIG. 14, the CS Frame may include a Link ID field for indicating a specific AP and a Change Sequence Value of the corresponding Link to notify the STA of whether a current critical update is performed.

FIG. 15 shows an example of a change sequence element format in the existing standard.

FIG. 16 shows an example of an MLD Change sequence element format.

In this specification, an MLD Change sequence element for MLD is proposed as shown in FIG. 16. The MLD Change sequence element of FIG. 16 is defined to include and transmit Change sequence information of other APs possessed by the AP MLD.

FIG. 17 shows another example of a CS Frame format.

An example of the case where the proposed CS Frame includes the MLD change sequence element is shown in FIG. 17.

FIG. 18 shows a TIM Frame format according to this embodiment.

Fields and elements defined in this specification may be included in an existing TIM Frame rather than a new frame (ie, CS Frame). In this case, the existing TIM Frame includes a link identifier, a change sequence, a broadcast time field, and the like. An example of this is shown in FIG. 18.

As shown in FIG. 18, an MLD Change sequence element may be included and used in an existing TIM Frame.

Additionally, whether a critical update has occurred can be notified for each link by using the Check Beacon field of the existing TIM Frame as it is. By adding a link indicator field to the existing TIM Frame form, it can be used together with the Check beacon field to indicate which link's next beacon to check. In other words, it can inform not only the peer AP of the connecting AP MLD in the TIM frame, but also whether or not the beacon check of other APs (other APs in the same AP MLD) is performed.

FIG. 19 is another example of a TIM Frame format.

Figure 20:
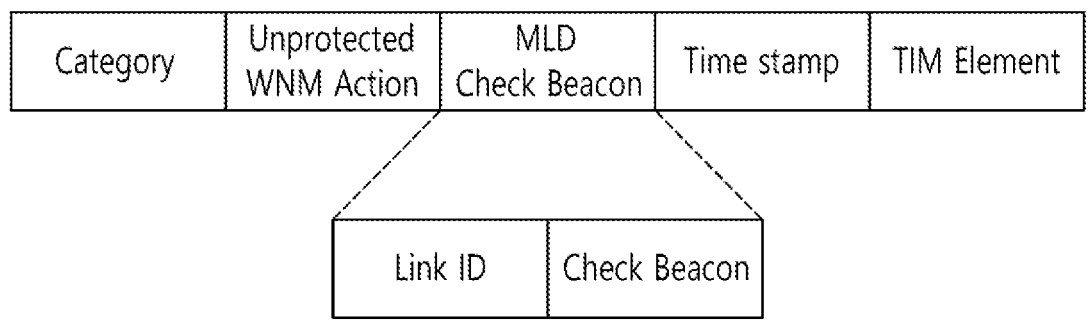
FIG. 20 is another example of a TIM Frame format.

FIG. 20 is another example of a TIM Frame format.

An embodiment for this is shown in FIGS. 19 and 20.

As shown in FIGS. 19 and 20, several fields in the TIM Frame are used together with a link indicator (e.g. Link ID) so that the AP can transmit information of other APs to the STA at once. Based on this information, the STA can know which link beacon to check. At this time, the link indicator may be included as a field in the TIM Frame, or may be used together with a check beacon field and/or a TIM element and a time stamp field to indicate information for each link as a subfield. Whether the corresponding information is defined as a field/subfield may be determined in various ways according to necessity later.

1.1.2 Operation of Broadcast Change Sequence Method

Section 1.1.2 describes the operation of the Broadcast Change sequence method proposed in this specification.

In this specification, two options are proposed for the Broadcast Change Sequence method. The first is a method in which the AP transmits only Change Sequence information for each link of the AP MLD at intervals previously requested by the STA. This is a method of transmitting time information for broadcasting critical update change information along with change sequence information for each link of the AP MLD at each period. This method is a method of explicitly transmitting updated information to the STA in addition to the change sequence change information when the AP of the AP MLD has a critical update, and increases the probability of the STA receiving change information by notifying the broadcast time in advance. At this time, the interval for transmitting the change sequence information may be set to a cycle previously requested by the STA (e.g. through a (re)association frame in the multi-link (re)setup process or a control field after multi-link setup). At this time, Broadcasting start time may start when the corresponding method is activated or depending on the method, it may start when the critical update of the BSS occurs. This starting point may vary from case to case or depending on AP implementation.

1.2.1 Broadcast Change Sequence Method 1

This method is a method in which the AP transmits change sequence information to the STA through an announcement frame (For example, newly defined Change Sequence frame or existing (Broadcast) Probe response, TIM Frame, etc.) other than a Beacon frame when a critical update occurs due to a change in key information of the BSS. In the case of the method in this section, the announcement frame includes link identifier information and change sequence information where the update occurred. For example, it may be included in the form of an MLD Change sequence element.

An embodiment of the CS Frame format used in the method is shown in FIG. 21.

FIG. 21 is an example of a CS Frame format used in Broadcast Change Sequence method 1.

Regardless of whether a critical update occurs in the BSS of the AP or whether the AP has a critical update, the AP broadcasts an announcement frame through the link at regular intervals. However, the corresponding value may be set to a constant time period (e.g. a constant value or the number of beacon periods between broadcast frame transmissions) or may be defined as the number of repeated transmissions within a beacon listen interval. In addition, this value may be a static value that does not change, or may be a dynamic value set at the request of the STA. The details related to the broadcast interval for this are described in detail in another section.

Through this information, the STA can obtain the critical update change information and version regardless of the beacon cycle. Upon confirming that there is critical update change information to be acquired through the announcement frame, the STA may immediately request and obtain the changed information from the AP through a request frame (e.g. probe request frame), or acquire it through a beacon in the next TBTT (Target Beacon Transmission Time). If the STA operates in the PS mode and operates in the doze state, it must obtain information by awake to the next TBTT.

This broadcast message may be useful for STAs with long-term beacon listen intervals. In the case of critical update information, since it is essential information that the STA must know, it may not be sufficient to transmit it only through Beacon. For example, when an STA operating in PS-mode for power saving and having a long-term listen interval uses the method, when the STA wakes up regardless of the TBTT timing (e.g. TWT SP (Target Wake Time Service Period)), the changed change sequence information can be checked. Thereafter, in order to obtain the changed critical update information, the STA may directly request it through a request frame (e.g. probe request) or obtain the changed information by necessarily awake at the next TBTT timing.

If this is extended to an MLD with multi-link in consideration of cross-link signaling, it is shown in FIG. 22.

FIG. 22 is another example of a CS Frame format used in Broadcast Change Sequence method 1.

Figure 23:
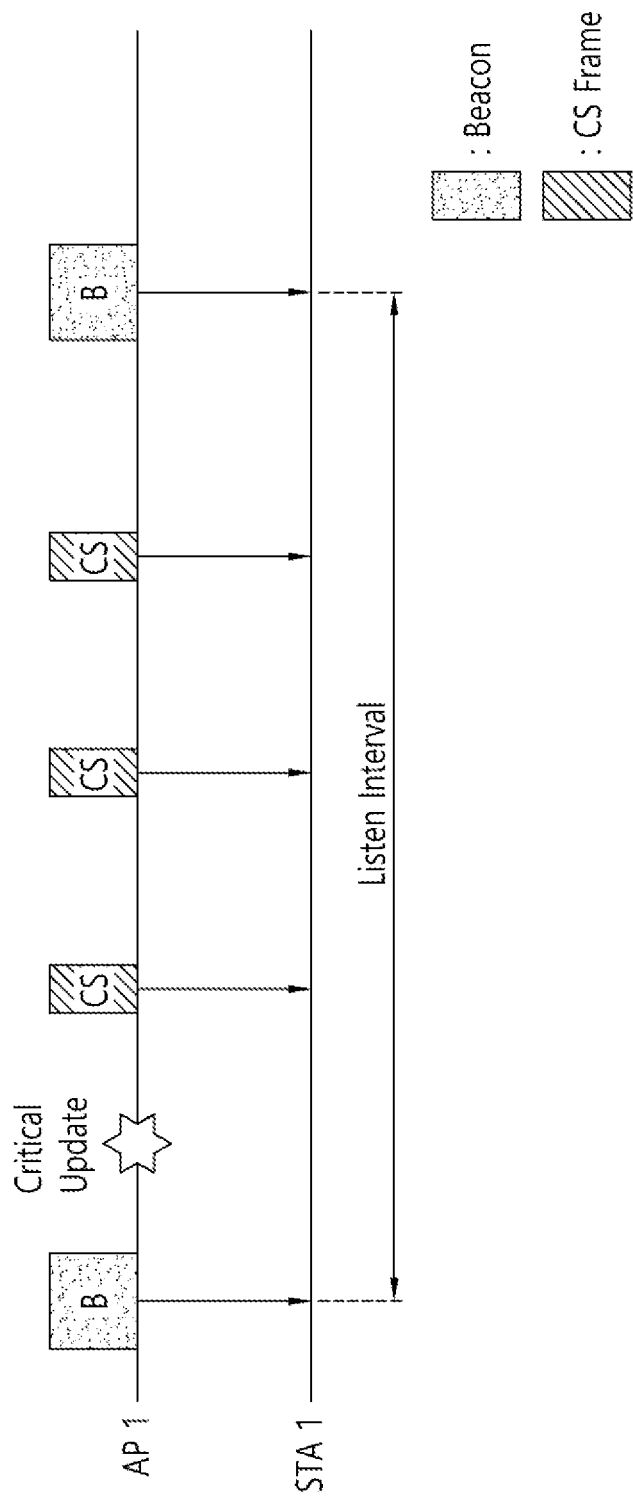
FIG. 23 is an example of a broadcast change sequence method 1 operation when a critical update occurs in an AP.

FIG. 23 is an example of a broadcast change sequence method 1 operation when a critical update occurs in an AP.

Referring to FIG. 23, when a critical update occurs after transmitting the first beacon in AP1, AP 1 broadcasts CS Frames at regular intervals until transmitting the second beacon. The corresponding CS Frame includes a link indicator in which a critical update has occurred and a change sequence element. Upon receiving this, STA 1 confirms from the CS Frame that a critical update has occurred in the current AP 1 and then directly requests change information or waits to receive a beacon in the next TBTT.

Figure 24:
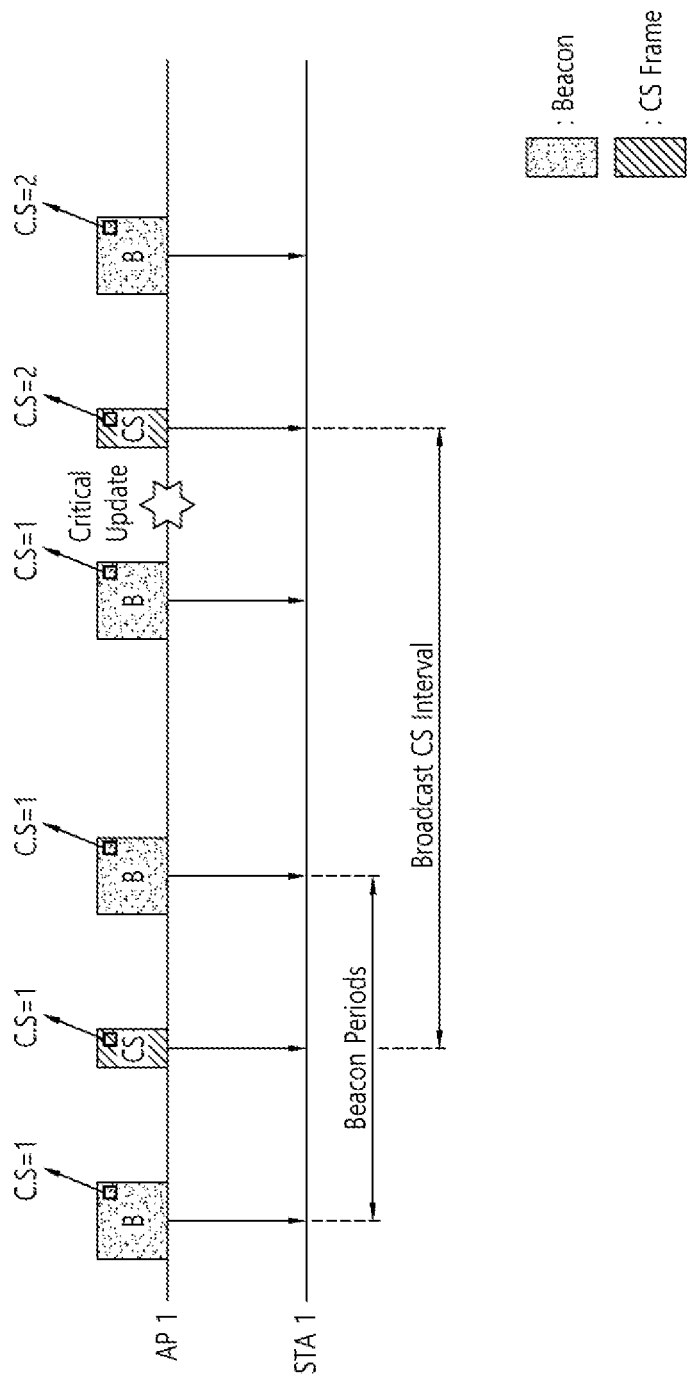
FIG. 24 is another example of a CS Frame format used in Broadcast Change Sequence method 1.

Additionally, FIG. 24 is an embodiment of an operation of transmitting a broadcast message (e.g. CS Frame) at regular intervals regardless of critical update in the AP.

FIG. 24 is another example of a CS Frame format used in Broadcast Change Sequence method 1.

The AP announces a frame containing the current change sequence information of the BSS every Interval previously set by the STA (ie, Broadcast CS interval value). For example, AP 1 transmits a change sequence value for the BSS of AP 1 as 1, and when a critical update occurs, the change sequence value is updated and transmitted. Referring to FIG. 24, STA 1 may acquire update information earlier than the next beacon through a CS Frame after a critical update occurs.

Figure 25:
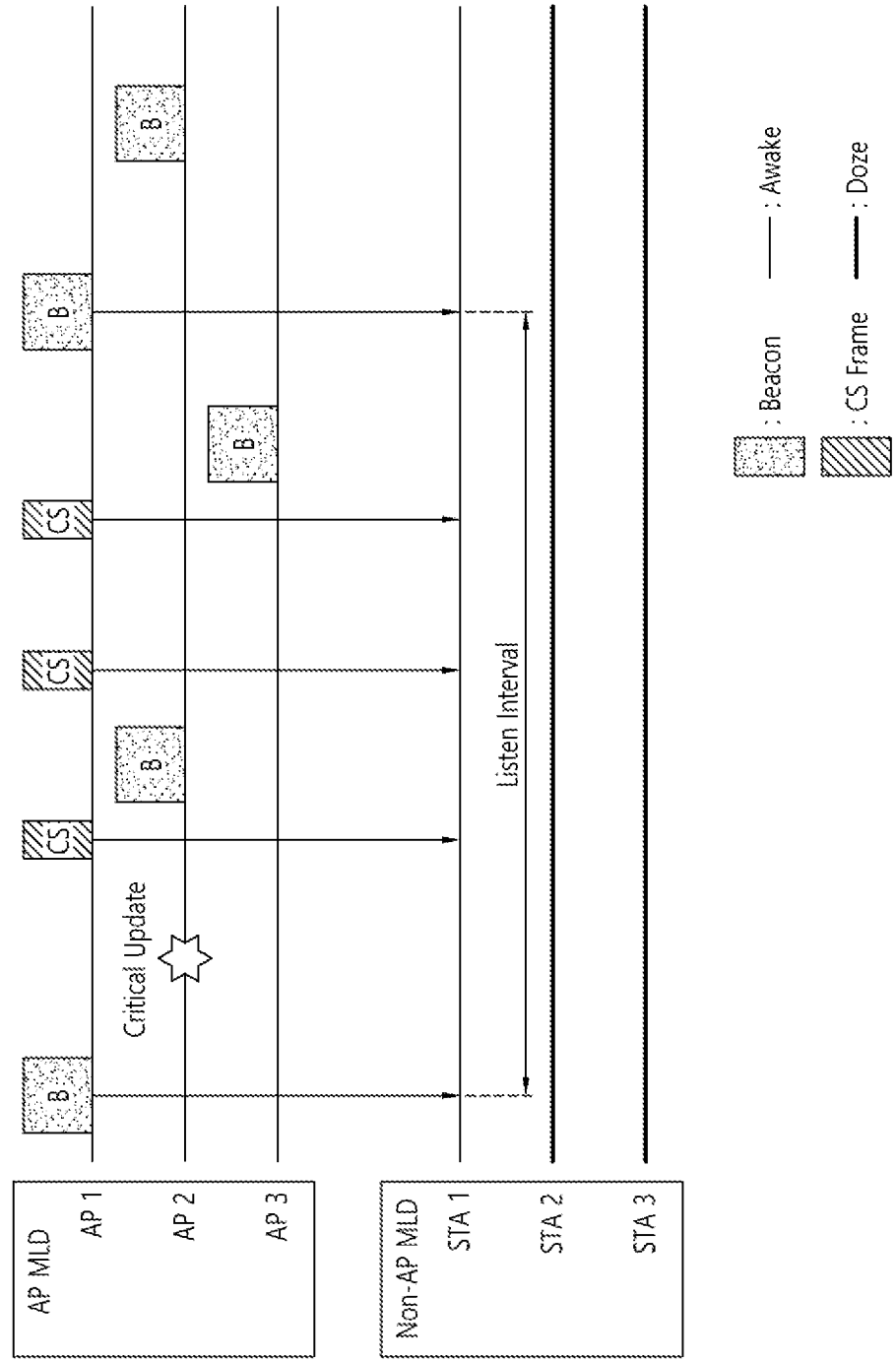
FIG. 25 is another example of a CS Frame format used in Broadcast Change Sequence method 1.

When a critical update occurs in any BSS of the AP MLD, it is broadcast at regular intervals using an announcement frame through any link of the AP MLD. However, the interval for broadcasting the announcement frame may be a static value or a dynamic value requested by the STA. The details related to the broadcast interval for this are described in detail in another section. In this case, when a critical update occurs in any BSS of the AP MLD, the AP MLD may consider various options for determining a link through which a broadcast message is transmitted. First, as previously mentioned, AP MLD can be sent to any links depending on AP selection. Second, AP MLD can send a broadcast message on other links except for the link where the critical update has occurred. Third, AP MLD can send broadcast messages on all currently enabled links. Fourth, the AP MLD can send a broadcast message on a link where a critical update has occurred. This broadcast message may be useful for STAs with long-term beacon listen intervals. When the AP MLD broadcasts an announcement frame, it transmits the link indicator where the critical update occurred along with change sequence information. If necessary, the AP MLD may transmit change sequence information for all links. Upon receiving this, the non-AP MLD checks the Link indicator, and in the case of a link set up by itself, compares it with Change sequence information stored by itself to check whether or not it has been updated. At this time, when a critical update occurs in the BSS of the peer AP of the STA that entered doze when the non-AP MLD operates in PS mode, without the need for an STA that has entered doze to awake, it can request and obtain update information on a link where a critical update has occurred obtained through an announcement frame using a link currently in an awake state through a request frame (i.e., cross-link signaling use). Alternatively, the STA may obtain change information through a beacon by awake according to the TBTT timing for the link where the update has occurred. In this case, since the change sequence can be obtained without being affected by the beacon interval between links compared to the existing method, critical update change information can be obtained more quickly. FIG. 25 is an embodiment of a Broadcast Change sequence method 1 operation when a critical update for another AP occurs in the AP MLD.

FIG. 25 is another example of a CS Frame format used in Broadcast Change Sequence method 1.

Referring to FIG. 25, it is assumed that STA 2 and STA 3 are in a doze state when the non-AP MLD operates in PS mode. At this time, STAs 2 and 3 do not necessarily receive Beacon. In this case, when a critical update occurs in AP 2 after transmitting the first beacon of AP 1, AP 1 broadcasts a CS Frame at regular intervals until the next beacon (ie, the second beacon). The corresponding CS Frame includes a link indicator in which a critical update has occurred and a change sequence element. Upon receiving this, the non-AP MLD may directly request critical update change information of AP 2 through cross-link signaling from STA 1 in an awake state, or directly wake up STA 2 to obtain critical update information. As in the existing operation, STA 2 does not know whether AP 2 is critically updated until it receives the next Beacon (ie, the second Beacon) of AP1, but through this method, regardless of the beacon period, it is possible to know whether the other AP of the AP MLD has a critical update.

Additionally, FIG. 26 is an embodiment of an operation of transmitting current critical update information of APs in a broadcast message (eg, CS Frame) at regular intervals regardless of critical update status in the AP MLD.

FIG. 26 is another example of a CS Frame format used in Broadcast Change Sequence method 1.

Figure 26A:
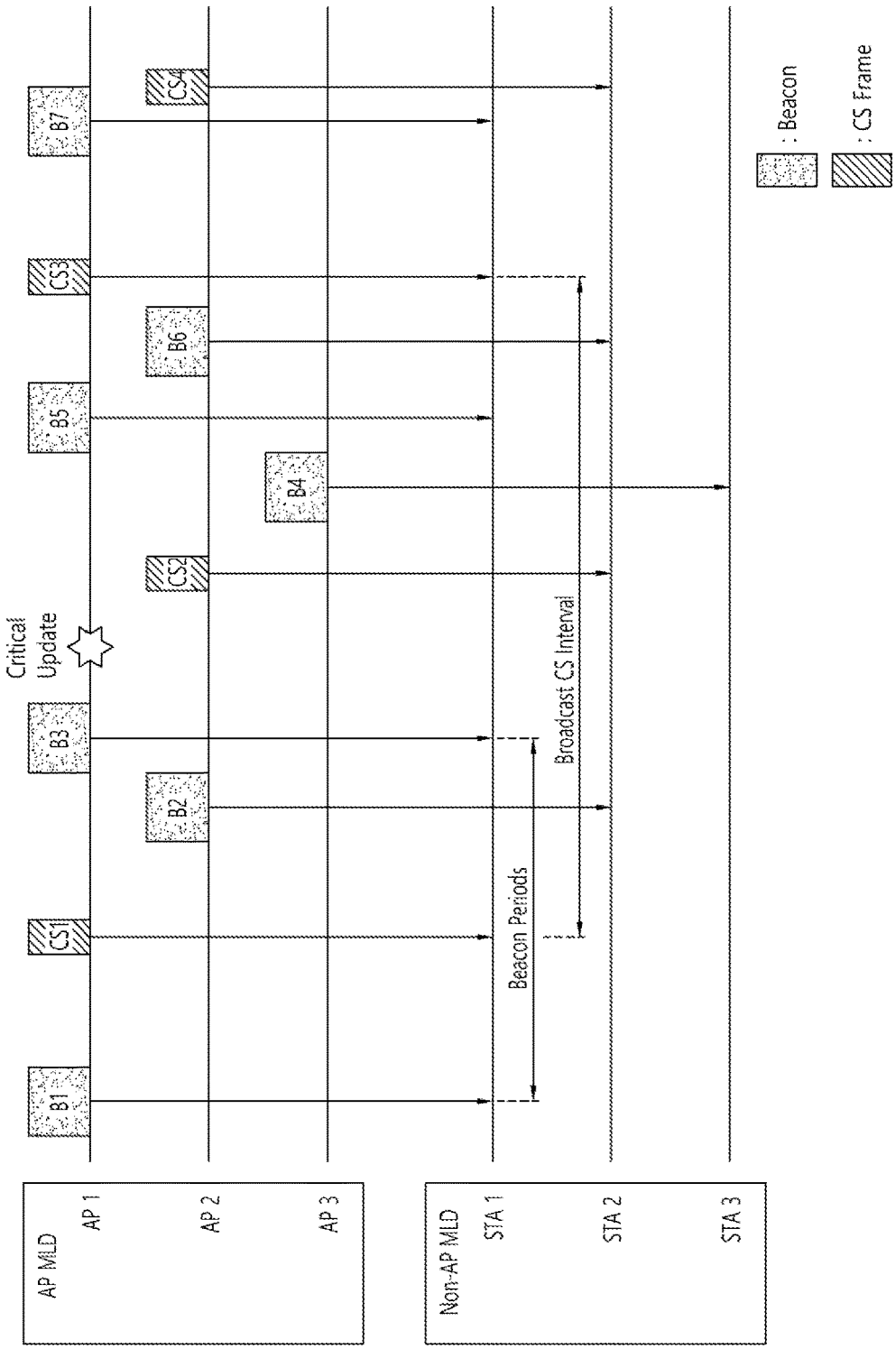
FIG. 26a shows an example in which a beacon frame and a CS frame are transmitted between an AP MLD and a non-AP MLD.
Figure 26B:
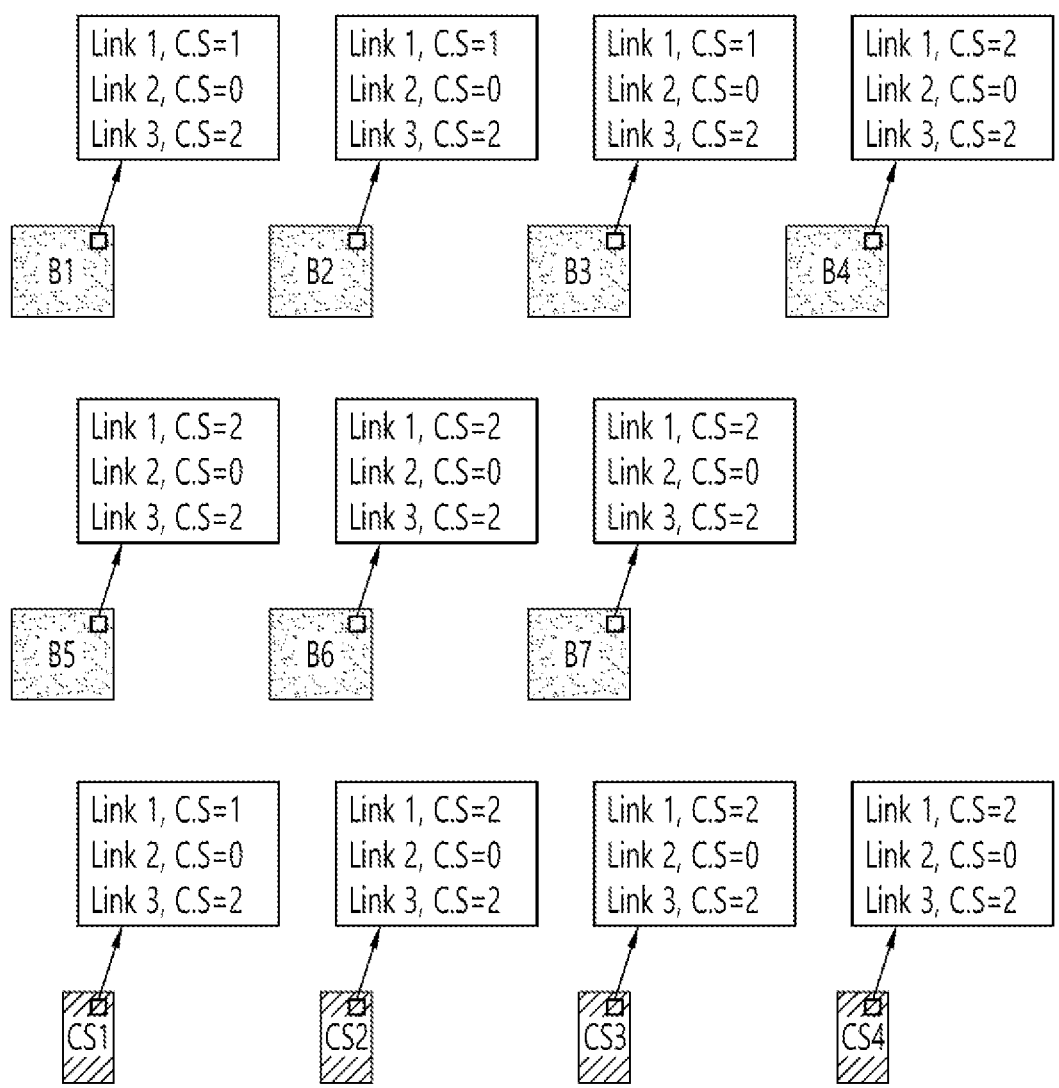

FIG. 26a shows an example in which a beacon frame and a CS frame are transmitted between an AP MLD and a non-AP MLD. FIG. 26b shows a change sequence value included in the beacon frame and CS frame of FIG. 26a.

Referring to FIG. 26, the AP of the AP MLD announces a frame containing current change sequence information of the BSS for each link at intervals (ie, broadcast CS interval values) previously set by the STA. At this time, the announcement frame includes not only change sequence information for its own link but also change sequence information for other links. As shown in the example of FIG. 26, when a critical update occurs in the BSS of AP1, a change sequence value for Link 1 of an announcement frame transmitted after the critical update occurs is updated and transmitted. For example, Critical update occurs in Link 1 after AP 2 transmits Beacon frame (B2), and then the announcement frame is an announcement frame (CS Frame) including the updated change sequence value (ie, Link 1, C.S.=2) is transmitted. As shown in FIG. 26, the non-AP MLD can obtain update information faster than the next beacon through an announcement frame after a critical update occurs, and in the case of MLD, critical update information generated from other links can also be quickly obtained. This characteristic can be effective for power saving by reducing the Awake duration, especially in the case of non-AP MLD operating in PS mode.

Additionally, the method may reuse the existing TIM Frame format rather than the CS Frame.

Since the TIM broadcast method of the existing standard is also a method of periodically notifying the STA of AP information, this method can also be used to notify critical update information. Therefore, it is possible to define and utilize an additional element in the existing TIM Frame without defining a separate new frame for broadcasting the critical update information.

First, the TIM Broadcast method of the existing standard is as follows.

TIM broadcast implementation is optional for Wireless Network Management (WNM) STAs. For STAs implementing TIM broadcast, dot11TIMBroadcastImplemented is equal to true. If dot11TIMBroadcastImplemented is true, dot11WirelessManagementImplemented is true. An STA with a dot11TIMBroadcastActivated value of true must set the TIM broadcast field of an extended function element that supports and transmits TIM broadcast to 1. Hereinafter, a TIM broadcast procedure for an STA for which dot11TIMBroadcastActivated is true will be described.

TIM frames are shorter in duration than beacon frames and are potentially transmitted at a higher data rate. TIM broadcasting allows non-AP STAs to receive TIM elements without receiving beacon frames that can reduce the wakeup time required in power saving mode. As the reception time is shortened, power consumption of the non-AP STA in the power saving mode is reduced. A short receive time can reduce the station's power consumption in standby mode.

A non-AP STA can activate a TIM broadcast service by including a TIM Broadcast Request element in a TIM Broadcast Request frame, Association Request frame, or Reassociation Request frame transmitted to an AP specifying a requested interval (TIM broadcast interval) between TIM frame transmissions.

When dot11TIMBroadcastActivated is true, upon receiving a TIM Broadcast Request element in an appropriate format in a TIM Broadcast Request frame, Association Request frame, or Reassociation Request frame, the AP responds to the corresponding TIM Broadcast Response frame, Association Response frame, or Reassociation Response frame should contain the TIM broadcast response element.

If the requested TIM broadcast interval is acceptable, the AP shall include a TIM broadcast response element specifying the requested TIM broadcast interval and a Status field. 'Accept' or 'Accept, valid timestamp present in TIM frames' if TSF timestamp exists in TIM frames.

When the AP overrides the requested TIM broadcast interval, the AP shall include a TIM broadcast response element specifying a different TIM broadcast interval and a Status field, which indicates that no valid TSF timestamp is present in the TIM frame. In this case, 'Overriden' is indicated, or 'Overriden, valid timestamp present in TIM frames' is indicated if TSF timestamp exists in TIM frames. In addition, the AP must include the currently activated smallest TIM broadcast interval in the TIM broadcast response element. Otherwise, the AP shall include a TIM broadcast response element with a Status field indicated as 'Denied'. The Status field of the TIM broadcast response element included in the Association Response frame or Reassociation Response frame affects only TIM broadcast negotiation.

An AP transmitting a TIM frame with a valid TSF timestamp shall set the value of the TIM frame timestamp defined in Maintaining Synchronization to Beacon Frame Timestamp.

If the AP accepts at least one TIM broadcast request with a non-zero TIM broadcast interval field and at least one non-AP STA in PS mode is still associated with the AP received in the most recent TIM broadcast response. In response to a TIM broadcast request with a TIM broadcast interval field with a Status field value other than 0 (Accepted), the AP shall transmit one or two TIM frames per TIM broadcast interval. The AP otherwise does not transmit the TIM frame. When the TIM broadcast intervals overlap, the transmitted TIM frame covers both intervals and does not need to be duplicated.

If the AP transmits two TIM frames per TIM broadcast interval, the AP must transmit the higher data rate TIM frame first, followed by the lower data rate TIM frame.

The AP must transmit the low data rate TIM frame at the same data rate or MCS as the Beacon frame. The AP must transmit the high data rate TIM frame at a higher data rate or using an MCS corresponding to the higher data rate.

The AP must accept the request for a new TIM broadcast interval if it means sending TIM frames more frequently. For example, if an AP currently transmits a TIM frame every 4th beacon period and receives a new request every 3 beacon periods, the AP must accept the new request and transmit a TIM frame every 3rd and 4th beacon period. An AP may ignore a mismatch request when available resources (e.g., counters) are exhausted. A non-matching request is one that contains an integer division or an interval that is not a multiple of the currently active TIM broadcast interval.

The AP must accept a TIM broadcast interval of 1.

The AP shall increase the value (modulo 256) of the Check Beacon field in the next transmitted TIM frame when significant updates occur to elements within the beacon frame. The following events are classified as critical updates.

a) Inclusion of a Channel Switch Announcement element
   b) Inclusion of an Extended Channel Switch Announcement element
   c) Modification of the EDCA parameters element
   d) Inclusion of a Quiet element
   e) Modification of the DSSS Parameter Set
   f) Modification of the CF Parameter Set element
   g) Modification of the HT Operation element
   h) Inclusion of a Wide Bandwidth Channel Switch element
   i) Inclusion of a Channel Switch Wrapper element
   j) Inclusion of an Operating Mode Notification element
   k) Inclusion of a Quiet Channel element
   l) Modification of the VHT Operation element The AP may classify other changes in the Beacon frame as significant updates.

The non-AP STA must attempt to receive the next Beacon frame when receiving the Check Beacon field containing a different value from the previously received Check Beacon field.

If dot11MultiBSSIDActivated is true, the A1 field of the TIM frame is the broadcast address, and the A2 and A3 fields are set to the transmitted BSSID.

FIG. 27 is an example of a TIM Frame format used in Broadcast Change Sequence method 1.

Referring to FIG. 27, the TIM Frame includes additional link indicator information and change sequence information (however, this information may be replaced with a check beacon field) along with existing elements and is transmitted.

At this time, signaling for activating the broadcast change sequence method may automatically include change sequence or check beacon information of other links in the TIM Frame when the STA activates the TIM Broadcast function, or as a separate method as described in Section 1.3 to be described later. Signaling for broadcast change sequence method can also be defined. If the existing TIM broadcast signaling is used as it is, the STA transmits a TIM frame for each broadcast interval requested when activating the TIM broadcasting function. At this time, the TIM frame includes TIM information and MLD change sequence information (or check beacon information) together is transmitted If the new Broadcast CS method signaling is used, the Broadcast CS method is activated separately from the TIM Broadcast signaling and only the TIM Frame is reused.

1.2.2 Broadcast Change Sequence Method 2

In this method, the AP sends an announcement frame (e.g., a newly defined Change Sequence frame or an existing (Broadcast) Probe response, TIM Frame to the STA when a critical update occurs due to a change in key information of the BSS or regardless of the AP's critical update), etc.)) to transmit change sequence information. In this section, some information is added and transmitted in the method proposed in section 1.2.1. The announcement frame includes broadcast time information along with link identifier information and change sequence information.

Unlike the method proposed in Section 1.2.1, the method transmits change sequence information for each link at regular intervals regardless of whether a critical update occurs or an AP's critical update, and then explicitly broadcasts the updated critical update information at a specific broadcast time. The reason for announcing the broadcast time in advance is that a power saving STA may miss the broadcasting message. Therefore, before explicitly broadcasting the critical update change information, the broadcast time is included in the broadcasting announcement frame so that the corresponding STA can receive it.

An embodiment of the CS Frame format used in the method is shown in FIG. 28.

FIG. 28 is an example of a CS Frame format used in Broadcast Change Sequence method 2.

If this is extended to MLD with multi-link in consideration of cross-link signaling, it is shown in FIG. 29.

FIG. 29 is another example of a CS Frame format used in Broadcast Change Sequence method 2.

An example of the MLD Change sequence element included in the CS Frame format of FIG. 29 is shown in FIG. 30.

FIG. 30 is an example of MLD Change Sequence Element used in Broadcast Change Sequence method 2.

When a critical update occurs in the AP's BSS, the AP broadcasts an announcement frame through the link at regular intervals. However, the interval for broadcasting the announcement frame must be set to a shorter value than the beacon listen interval, and the corresponding value can be set as a time period or defined as the number of repeated transmissions within the beacon listen interval. In addition, this value may be a static value that does not change, or may be a dynamic value set at the request of the STA. The details related to the broadcast interval for this are described in detail in another section.

When a critical update occurs in the AP's BSS, the AP broadcasts an announcement frame regardless of the beacon period. The STA receiving this announcement frame can confirm that the critical update has occurred in the AP through the link ID and change sequence information, and can also check the broadcast time to confirm when the change information of the critical update is broadcasted. Therefore, the STA waits to receive the broadcasting frame at the time specified in the Broadcast Time field. (For example, when the STA operates in PS mode, it wakes up at the corresponding time.) Through the repeatedly transmitted announcement frame, the STA can obtain critical update change information and version regardless of the beacon cycle, by explicitly obtaining updated information at the broadcast time specified in the corresponding announcement frame, critical update information can be received more accurately and quickly regardless of the beacon cycle. If an STA that wants to acquire information immediately checks whether or not the critical update change information is available through an announcement frame, the STA may directly request and obtain it immediately through a request frame (e.g., probe request).

Figure 31:
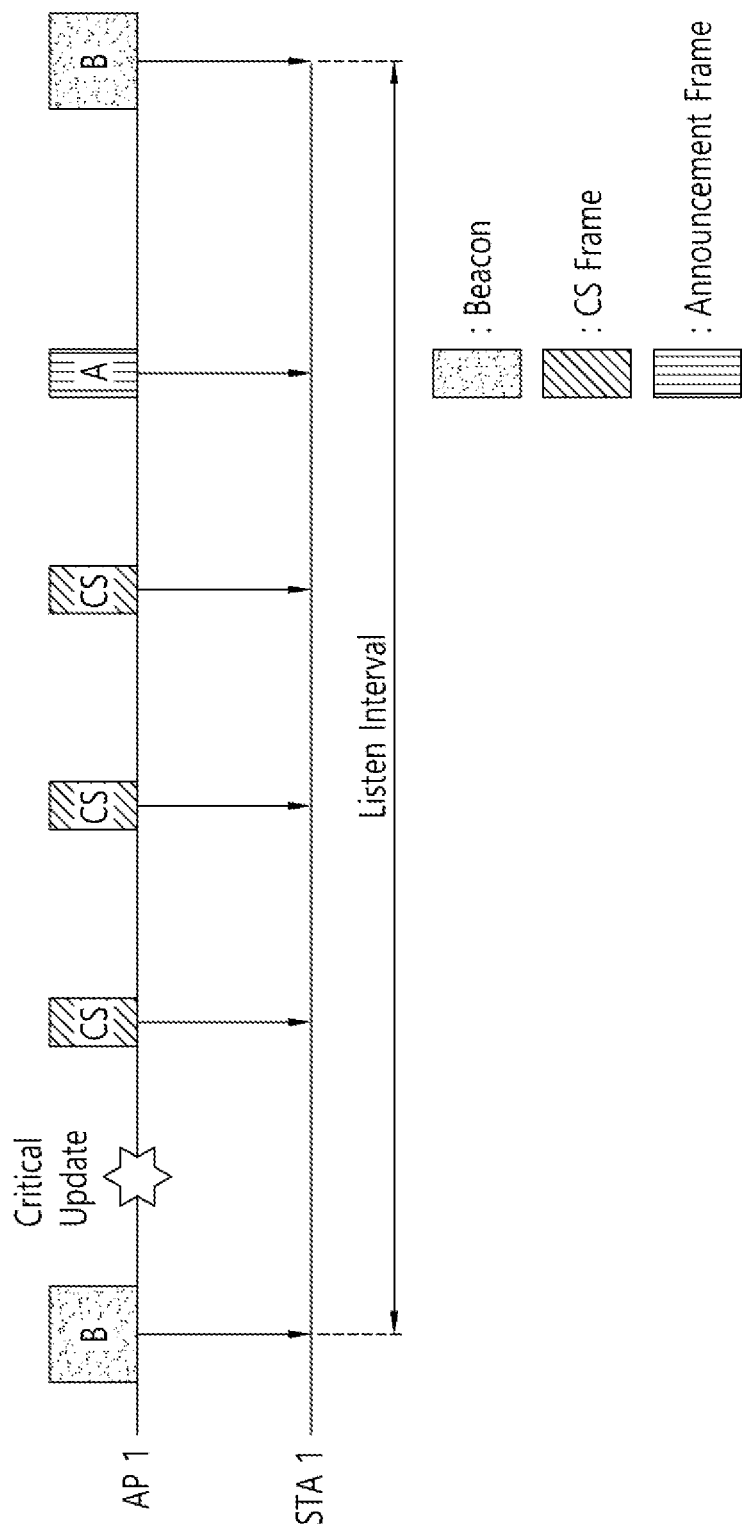
FIG. 31 shows an example of Broadcast Change sequence method 2 operation when a critical update occurs in an AP.

FIG. 31 shows an example of Broadcast Change sequence method 2 operation when a critical update occurs in an AP.

Referring to FIG. 31, when a critical update occurs after transmitting a first beacon in AP 1, AP 1 broadcasts a CS Frame at regular intervals until transmitting a second beacon. The corresponding CS Frame includes a link indicator where a critical update has occurred, a change sequence element, and broadcast time information.

Upon receiving this, STA 1 can obtain from the CS Frame that a critical update has occurred in AP 1 and when AP 1 will broadcast critical update change information through Broadcast Time information. Upon receiving this CS Frame, STA 1 confirms that a critical update has occurred in the current AP 1 and then directly requests change information or waits to receive an announcement frame.

Figure 32:
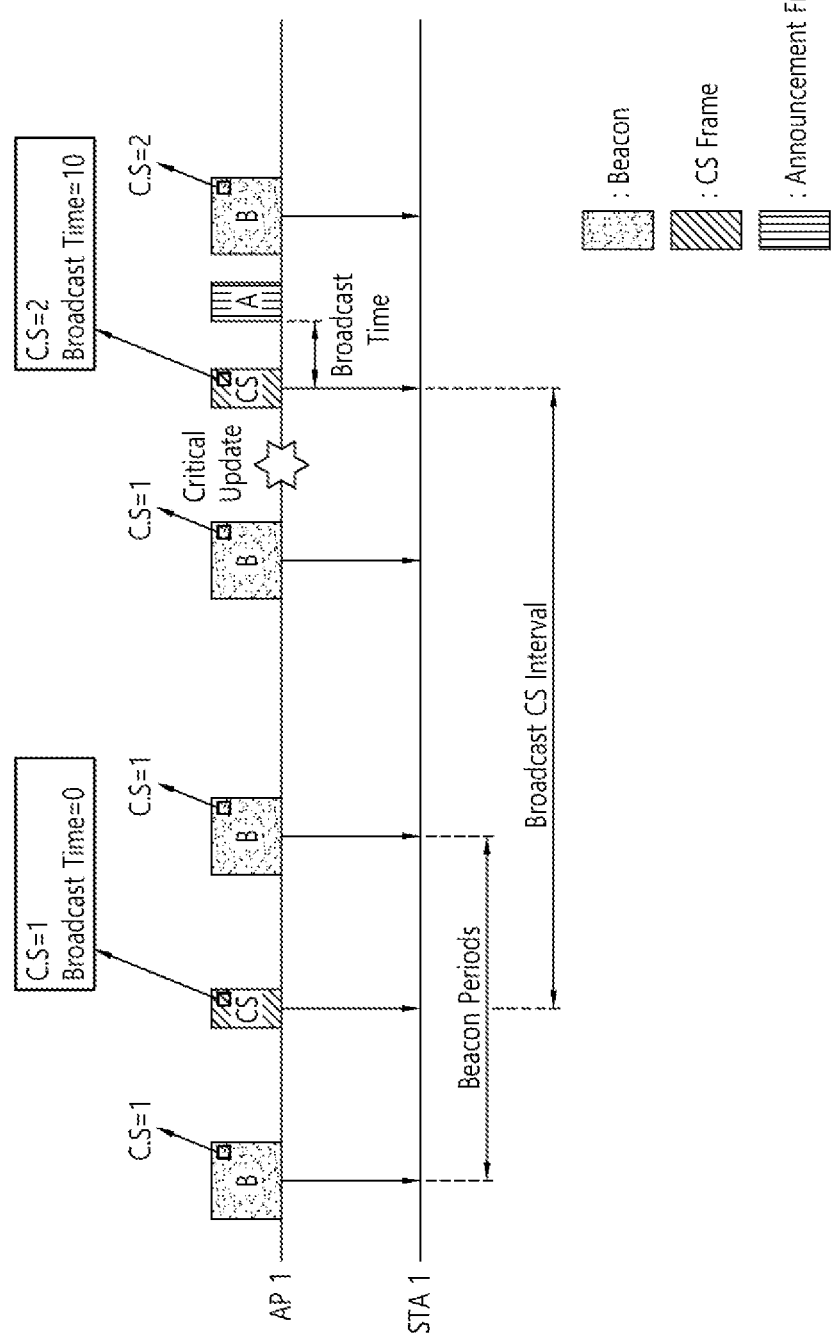
FIG. 32 shows another example of Broadcast Change sequence method 2 operation when a critical update occurs in an AP.

Additionally, FIG. 32 is an embodiment of an operation of transmitting a broadcast message (e.g. CS Frame) at regular intervals regardless of critical update in the AP.

FIG. 32 shows another example of Broadcast Change sequence method 2 operation when a critical update occurs in an AP.

Referring to FIG. 32, the AP announces a frame containing current change sequence information of the BSS at intervals (ie, broadcast CS interval values) previously set by the STA. For example, in AP 1, CS Frame is announced every predetermined interval. If critical update does not occur, it is transmitted with a change sequence value set to Broadcast Time=0. However, if a critical update occurs, a broadcast time value is set along with a change sequence value in the CS frame (e.g. broadcast time=10) and transmitted. After the AP transmits the corresponding CS Frame, it explicitly transmits the Announcement frame including the updated change information value (updated element value, not the change sequence value) after the time set as Broadcast Time has elapsed. The STA determines whether to update through the change sequence value included in the CS Frame, checks the Broadcast Time, and if the Broadcast Time is set, the STA determines whether to receive the corresponding Announcement frame as needed (the STA in PS mode can obtain update information by awake at that time. If it is not desired, it can be ignored).

When a critical update occurs in any BSS of the AP MLD, it is broadcast at regular intervals using an announcement frame through any link of the AP MLD. However, the interval for broadcasting the announcement frame may be a static value or a dynamic value requested by the STA. The details related to the broadcast interval for this are described in detail in another section. In this case, when a critical update occurs in any BSS of the AP MLD, the AP MLD may consider various options for determining a link through which a broadcast message is transmitted. First, as previously mentioned, AP MLD can be sent to any links depending on AP selection. Second, AP MLD can send a broadcast message on other links except for the link where the critical update has occurred. Third, AP MLD can send broadcast messages on all currently enabled links. Fourth, the AP MLD can send a broadcast message on a link where a critical update has occurred. This broadcast message may be useful for STAs with long-term beacon listen intervals. When a critical update occurs in the BSS of the AP MLD, the AP broadcasts an announcement frame regardless of the beacon cycle. At this time, the announcement frame includes the link indicator where the critical update occurred, change sequence information, and broadcast time information to transmit the changed critical update information. When a critical update occurs in one or more BSSs of the AP MLD, the AP broadcasts an announcement frame regardless of the beacon period. The STA receiving this announcement frame can confirm that the critical update has occurred in the AP through the link ID and change sequence information, and can also check the broadcast time to confirm when the change information of the critical update is broadcasted. Therefore, the STA waits to receive a broadcast frame including critical update information at the time specified in the Broadcast Time field, if necessary. (For example, when the STA operates in PS mode, it wakes up at the corresponding time.) Through the repeatedly transmitted announcement frame, the STA can obtain the critical update change information and version regardless of the beacon cycle, and the corresponding announcement Critical update information can be received more accurately and quickly regardless of the beacon cycle by acquiring updated information explicitly at the broadcast time specified in the frame. If an STA that wants to acquire information immediately checks whether or not the critical update change information is available through an announcement frame, the STA may directly request and obtain it immediately through a request frame (e.g., probe request).

Figure 33:
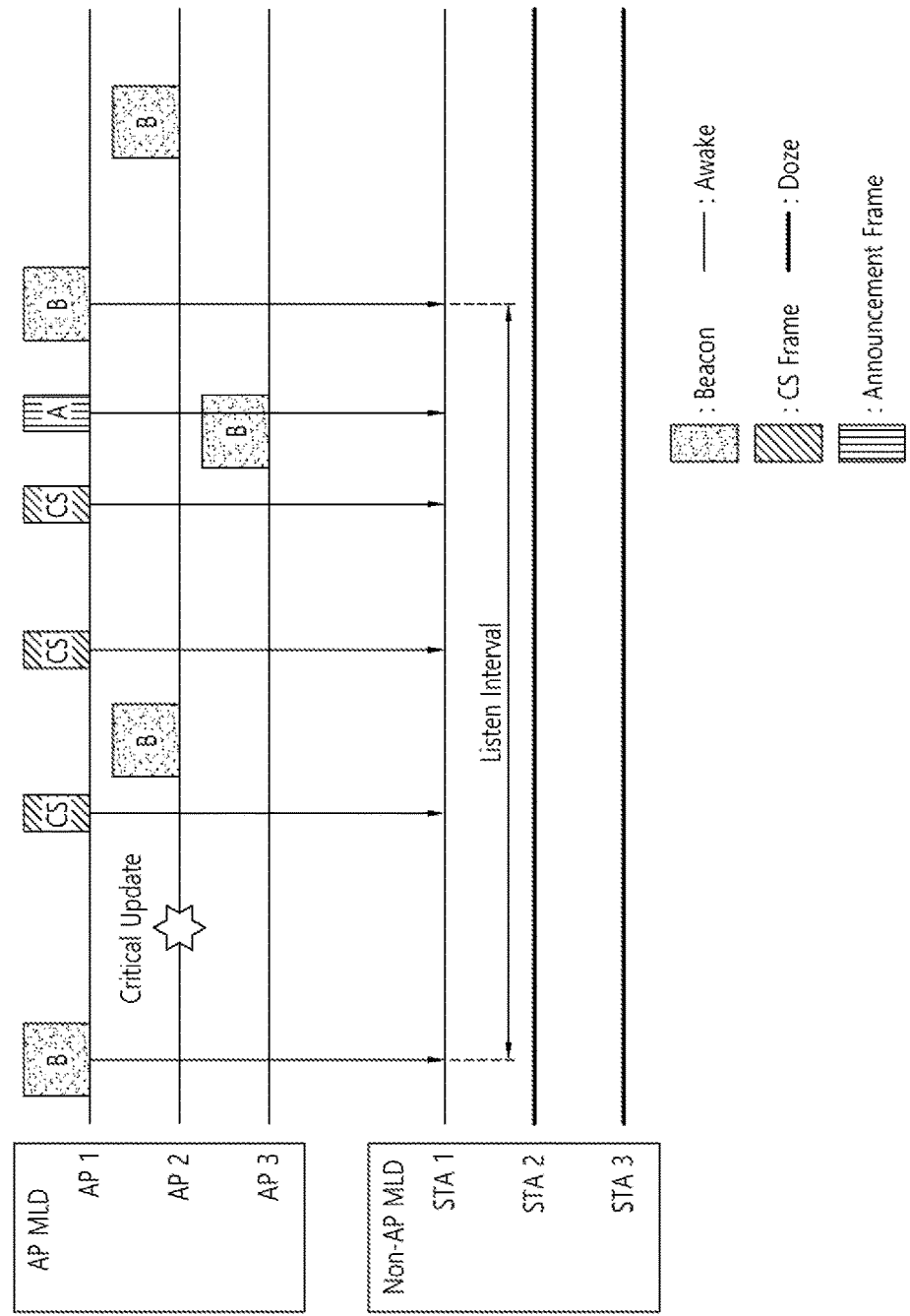
FIG. 33 shows another example of a Broadcast Change sequence method 2 operation when a critical update occurs in the AP MLD.

FIG. 33 shows another example of a Broadcast Change sequence method 2 operation when a critical update occurs in the AP MLD.

Referring to FIG. 33, it is assumed that STA 2 and STA 3 are in a doze state when the non-AP MLD operates in PS mode. At this time, STAs 2 and 3 do not necessarily receive Beacon. In this case, when a critical update occurs in AP 2 after transmitting the first beacon of AP 1, AP 1 broadcasts a CS Frame at regular intervals until the next beacon (ie, the second beacon). The corresponding CS Frame includes a link indicator where a critical update has occurred, a change sequence element, and broadcast time information.

Upon receiving this, STA 1 can obtain from the CS Frame that a critical update has occurred in AP 2 and when AP 2 will broadcast critical update change information through Broadcast Time information. Upon receiving this CS Frame, STA 1 confirms that a critical update has occurred in the current AP 2, and then directly requests change information through cross-link signaling or waits to receive an announcement frame at a corresponding broadcasting time.

As in the existing operation, STA 2 does not know whether AP 2 is critically updated until it directly awakes to acquire change information of AP 2 or receives AP 1's next Beacon (i.e., the second Beacon). Regardless of the period, it is possible to know whether the other AP of the AP MLD has a critical update.

Additionally, FIG. 34 is an embodiment of an operation of transmitting a broadcast message (e.g. CS Frame) at regular intervals regardless of critical update in the AP MLD.

FIG. 34 shows another example of a Broadcast Change sequence method 2 operation when a critical update occurs in the AP MLD.

Figure 34A:
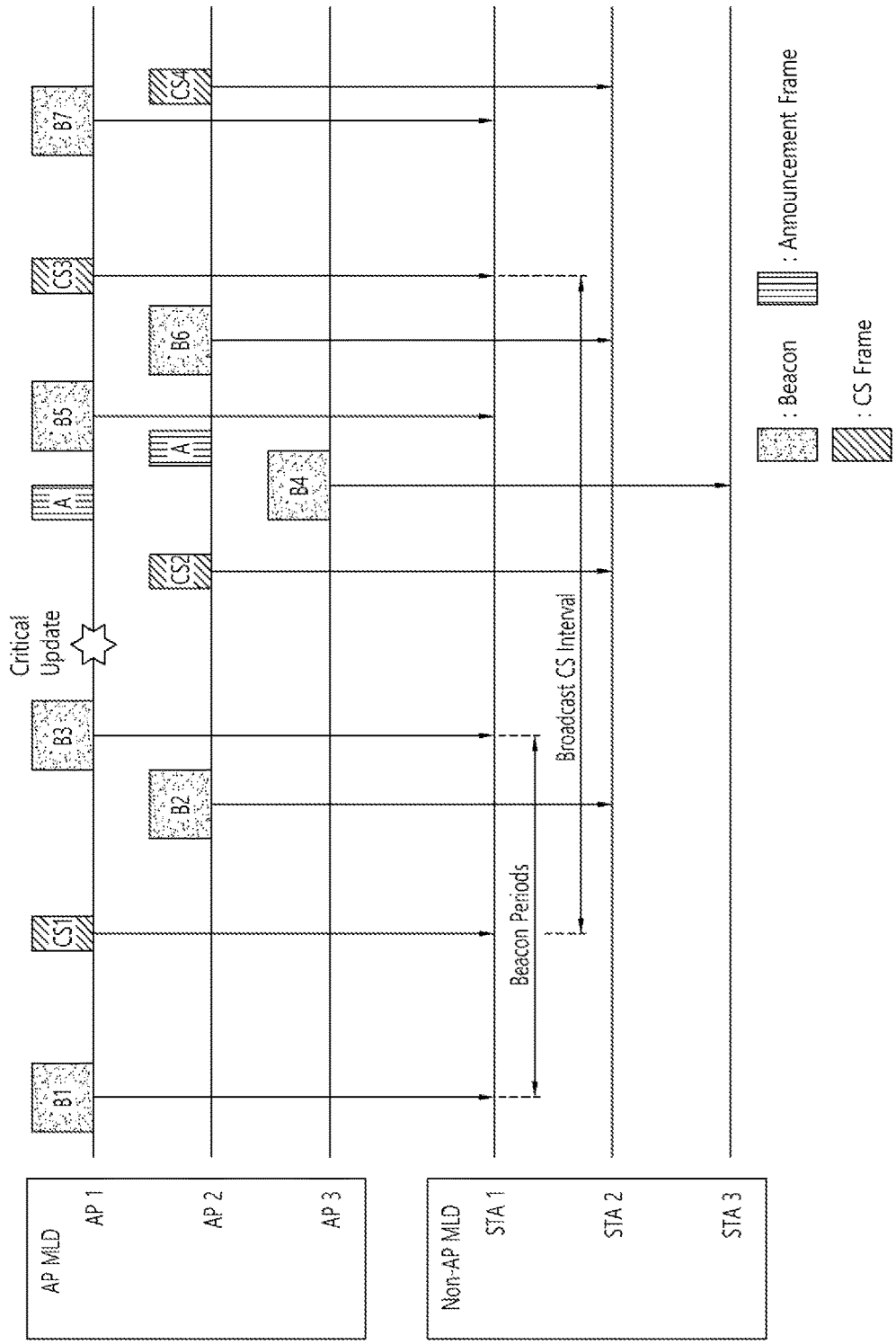
FIG. 34a shows an example in which a beacon frame, a CS frame, and an announcement frame are transmitted between an AP MLD and a non-AP MLD.
Figure 34B:
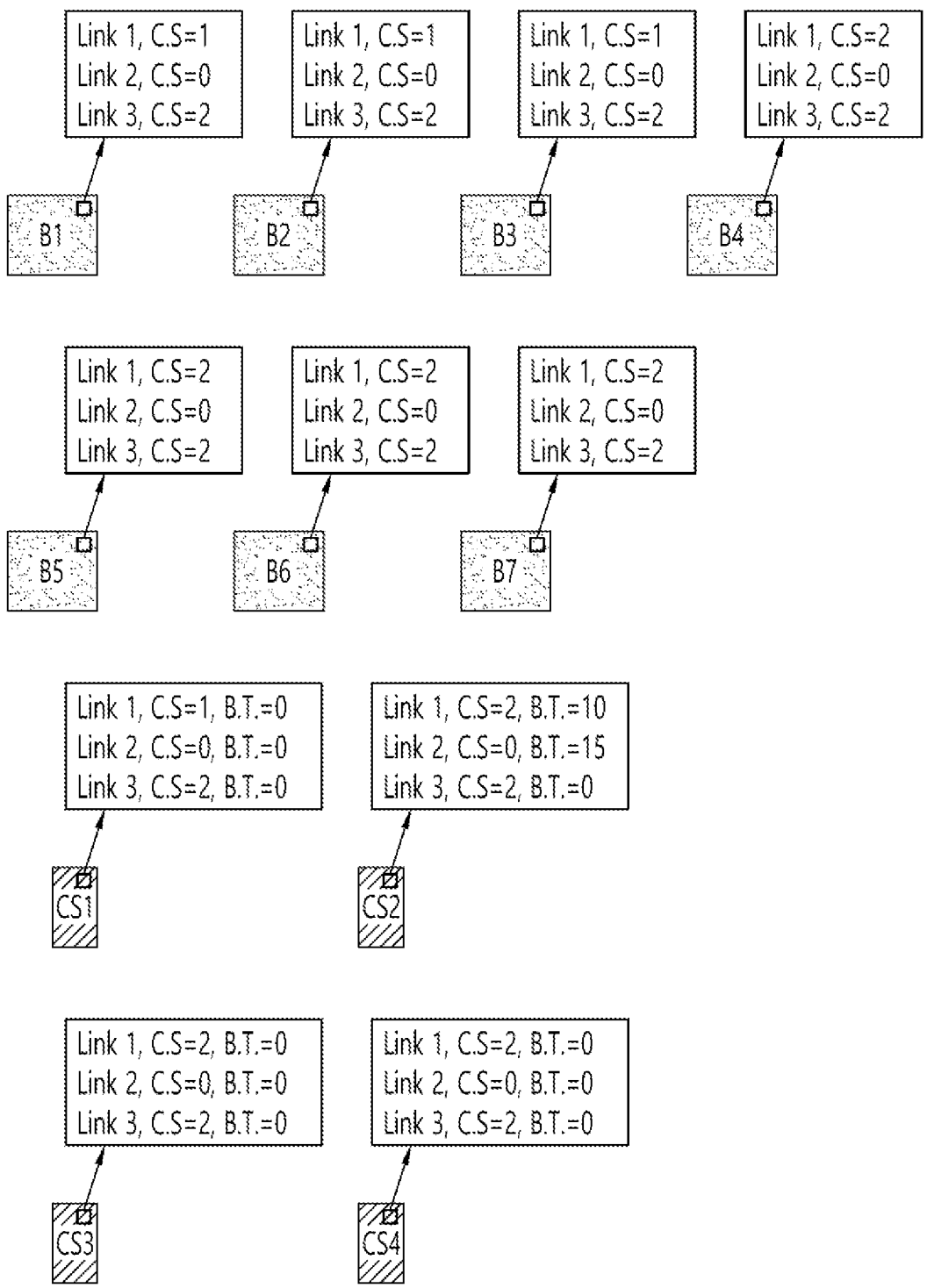

FIG. 34a shows an example in which a beacon frame, a CS frame, and an announcement frame are transmitted between an AP MLD and a non-AP MLD. FIG. 34b shows a change sequence value and broadcast time included in the beacon frame and CS frame of FIG. 34a.

Referring to FIG. 34, the AP of the AP MLD announces a frame containing current change sequence information of the BSS at intervals (ie, broadcast CS interval values) previously set by the STA. For example, in AP 1, an announcement frame is announced every predetermined interval. If a critical update does not occur, it is transmitted with a change sequence value set to Broadcast Time=0. At this time, the announcement frame includes information on other links as well as change sequence and broadcast time information on its own link. As shown in FIG. 34, when a critical update occurs in the BSS of AP1, the change sequence value and broadcast time for Link 1 of the announcement frame (CS Frame 2) transmitted after the occurrence of the critical update are updated and transmitted. For example, Critical update occurred in Link 1 after AP 2 transmitted Beacon frame (B2), and then CS Frame (CS 2) updated change sequence value (ie, Link 1, C.S.=2) and each Link Announce CS Frame with each Broadcast Time (i.e. Link 1, B.T.=10/Link 2, B.T.=15). At this time, the broadcast time may be determined according to the data traffic situation for each link of the AP MLD. And each link of AP MLD broadcasts updated information explicitly through announcement frame according to announcement broadcast time. As shown in FIG. 34, the non-AP MLD can obtain update information faster than the next beacon through the CS Frame of the other link after the critical update occurs, in the case of MLD, critical update information generated in other links can also be quickly acquired. This characteristic can be effective for power saving by reducing the Awake duration, especially in the case of non-AP MLD operating in PS mode.

Additionally, the method may reuse the existing TIM Frame format rather than the CS Frame.

Since the existing standard TIM broadcast method is also a method of periodically notifying the STA of AP information, this method can also be used to notify critical update information. Therefore, it is possible to define and utilize an additional element in the existing TIM Frame without defining a separate new frame for broadcasting the critical update information.

At this time, an embodiment of the TIM Frame format for method 2 is shown in FIG. 35.

FIG. 35 shows an example of a TIM Frame format for Broadcast Change sequence method 2.

Referring to FIG. 35, the TIM Frame includes link indicator information, change sequence information (however, this information may be replaced with a check beacon field), and broadcast time information along with existing elements and is transmitted.

At this time, the signaling for activating the broadcast change sequence method may automatically include change sequence or check beacon information and broadcast time information of other links in the TIM frame when the STA activates the TIM broadcast function, or it can also be defined as signaling for a separate broadcast change sequence method, as described in Section 1.3 to be described later. If the existing TIM broadcast signaling is used as it is, the STA transmits the TIM frame for each broadcast interval requested when the TIM broadcasting function is activated. At this time, along with the TIM information, MLD change sequence information (or check beacon information) and broadcast time information for explicitly notifying the time to transmit the critical update message are transmitted to the TIM Frame. If the new Broadcast CS method signaling is used, the Broadcast CS method is activated separately from the TIM Broadcast signaling and only the TIM Frame is reused.

1.3 Signaling for Broadcast Change Sequence Method

In this specification, signaling for activating the proposed Broadcast Change sequence method is proposed.

The STA must negotiate with the AP to use the Broadcast Change sequence method. To this end, the STA transmits a request frame to the AP to request activation of the broadcast change sequence method. For example, the STA may activate a broadcast change sequence service by including a broadcast change sequence request element in an association request, a reassociation request, or a newly defined broadcast change sequence frame. At this time, the STA of the non-AP MLD may activate the service for the corresponding Broadcast Change Sequence for each link at the STA level or for all links at the MLD level. In this specification, both cases are considered. If a corresponding service is activated at the MLD level, the corresponding service is applied to all links when the STA activates it through service negotiation through one link. On the other hand, if the corresponding service can be activated at the STA level, the STA can activate or deactivate the corresponding service for each link requiring the service. In this case, the STA must include link indicator information for indicating a link in the Request frame requesting activation of the corresponding service.

Broadcast change sequence request element for requesting activation of broadcast change sequence service includes the following information. (However, the information defined below may be included in the Broadcast Change sequence request element as needed or may be omitted depending on the situation)

1) Change sequence Broadcast Interval: The number of announcement frame periods between beacon frame transmissions. If the STA makes a request by setting the change sequence broadcast interval to 0, it means that the broadcast change sequence service is deactivated.

2) Periodic: Information indicating whether the corresponding broadcasting message is transmitted periodically or aperiodically. If the value is 1, it means that the corresponding broadcast message is transmitted according to the cycle requested by the STA, regardless of whether an event occurs (i.e., critical update). If the value is 0, the broadcast message whether) means that it is announced aperiodically.

3) Link Identifier: Link indicator information for indicating a link (e.g. Link ID). If the corresponding service can be activated at the STA level, Link ID information to indicate the link when requesting the service is additionally required.

FIG. 36 shows an example of a Broadcast Change sequence request element format.

FIG. 37 shows another example of a Broadcast Change sequence request element format.

FIG. 38 shows another example of a Broadcast Change sequence request element format.

An example of the format of a request frame for activating the Broadcast Change Sequence service is shown in FIG. 39. The request frame of FIG. 39 includes a Broadcast change sequence request element.

FIG. 39 shows an example of a Broadcast Change sequence Request frame format.

When the AP receiving the Request frame as shown in FIG. 39 accepts it, the AP responds an Association response, Reassociation response or newly defined Broadcast Change sequence response frame including Broadcast Change sequence response element for specifying Change sequence broadcast interval with an 'Accept' status code. An example of the format of a Broadcast Change sequence response element is shown in FIG. 40.

FIG. 40 shows an example of a broadcast change sequence response element format.

The Broadcast change sequence response element contains the following information.

1) Status: Status code information for STA's request. If the request is accepted, the 'Accept' code is sent, and if the request is rejected, the 'Denied' code is sent. An example of the Status field is as follows.

TABLE 1

| Field value | Description |
| --- | --- |
| 0 | Accept |
| 1 | Accept, valid timestamp present in TIM frames |
| 2 | Denied |
| 3 | Overridden |

TABLE 1-continued

| Field value | Description |
| --- | --- |
| 4 | Overridden, valid timestamp present in TIM frames |
| 5-255 | Reserved |

2) Change sequence Broadcast Interval (optional): The number of scheduled announcement Frame periods between Beacon frame transmissions.

3) Change sequence Broadcast Offset (optional): Offset information in microseconds with tolerance (e.g. ±4 μs) for TBTT where announcement frame is reserved for transmission.

4) High rate change sequence rate (optional): A rate indicator used to transmit a high data rate announcement frame. Setting this field to 0 indicates that high data rate announcement frames are not transmitted.

5) Low rate change sequence rate (optional): A rate indicator used to transmit a low data rate announcement frame. Setting this field to 0 indicates that low data rate announcement frames are not transmitted.

An example of a format of a response frame for a request for activating a broadcast change sequence service is shown in FIG. 41. The corresponding request frame includes a Broadcast change sequence response element.

FIG. 41 shows an example of a Broadcast Change sequence Response frame format.

Referring to FIG. 41, the Broadcast Change Sequence Response frame includes a Category subfield, an EHT Action subfield, and a Broadcast change sequence response element.

Hereinafter, the above-described embodiment will be described with reference to FIGS. 1 to 41.

Figure 42:
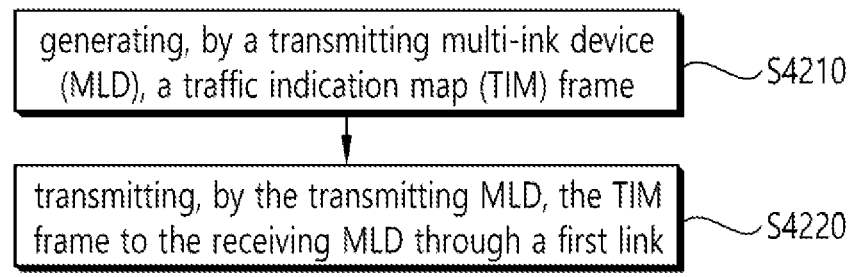
FIG. 42 is a flowchart illustrating a procedure in which a transmitting MLD provides information on APs included in the transmitting MLD to a receiving MLD based on a TIM frame according to the present embodiment.

FIG. 42 is a flowchart illustrating a procedure in which a transmitting MLD provides information on APs included in the transmitting MLD to a receiving MLD based on a TIM frame according to the present embodiment.

The example of FIG. 42 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for notifying whether a critical update of another AP in a transmitting MLD is based on a TIM frame in MLD communication. The transmission MLD may be an AP MLD, and the reception MLD may be a non-AP MLD.

In step S4210, a transmitting multi-link device (MLD) generates a Traffic Indication Map (TIM) frame.

In step S4220, The transmitting MLD transmits the TIM frame to the receiving MLD through a first link.

For example, The transmitting MLD includes a first transmitting station (STA) operating on the first link, a second transmitting STA operating on a second link and a third transmitting STA operating on a third link. The receiving MLD may include a first receiving STA operating on the first link. The receiving MLD may further include a second receiving STA operating on the second link and a third receiving STA operating on the third link.

The TIM frame includes a Check Beacon field and an MLD Change Sequence field. The check beacon field includes critical update information of the first transmitting STA. The MLD change sequence field includes critical update information of the second and third transmitting STAs.

That is, this embodiment proposes a method of notifying critical update information of an AP and other Aps connected in a transmitting MLD based on a previously defined TIM frame. The previously defined check beacon field in the TIM frame is used to inform critical update information of connected APs, and the newly defined MLD change sequence field is used to inform critical update information of other APs.

The transmitting MLD may transmit a beacon frame to the receiving MLD through the first link.

When a critical update occurs in a basic service set (BSS) of the second transmitting STA after the beacon frame is transmitted and before the TIM frame is transmitted, the TIM frame may include an updated change sequence value for the second link. The updated change sequence value for the second link may be a value increased by 1 from the change sequence value for the second link included in the beacon frame. The updated change sequence value for the second link may be included in critical update information of the second transmitting STA.

In addition, when a critical update occurs in the BSS of the third transmitting STA after the beacon frame is transmitted and before the TIM frame is transmitted, the TIM frame may include an updated change sequence value for the third link. The updated change sequence value for the third link may be a value increased by 1 from the change sequence value for the third link included in the beacon frame. The updated change sequence value for the third link may be included in critical update information of the third transmitting STA.

The transmitting MLD may transmit a next beacon frame to the receiving MLD through the first link. The next beacon frame may be transmitted after the TIM frame is transmitted.

When the first receiving STA operates in a power saving mode and activates TIM broadcast, the first receiving STA may be awake based on a transmission period of the TIM frame. The transmission period of the TIM frame may be shorter than a transmission period of the beacon frame.

Since this embodiment assumes that the TIM broadcast is activated, the TIM frame may be transmitted periodically (every broadcast interval). In addition, since it is assumed that the receiving MLD operates in a power saving mode, the first receiving STA is awake according to the period of the TIM frame, and does not necessarily need to be awake to receive a beacon frame. Accordingly, when a critical update of another AP occurs after the beacon frame, the first receiving STA can receive critical update information of another AP through the TIM frame without receiving the next beacon frame. This has an effect of reducing overall frame overhead and performing efficient power saving.

Also, the TIM frame may further include broadcast time information. The broadcast time information may be information informing a time at which the critical update information of the second and third transmitting STAs will be transmitted. That is, the first receiving STA can know when critical update information of another AP is broadcast by checking the broadcast time information. When the first receiving STA operates in the power saving mode, it may wake up at the time specified in the broadcast time information. In addition, the first receiving STA may receive a (separate) notification frame from the transmitting MLD at the time specified in the broadcast time information to check critical update information of another AP.

The receiving MLD may further include a second receiving STA operating in the second link and a third receiving STA operating in the third link.

The TIM frame may further include link indicator information. The link indicator information may include identifier information of the first, second or third link. The critical update information of the first, second, or third transmitting STA may be included in the TIM frame based on the link indicator information.

Also, the transmitting MLD may transmit a Change Sequence (CS) frame to the receiving MLD instead of the TIM frame through the first link. The CS frame may also include link indicator information, important update information (change sequence value) of an AP in the transmitting MLD, and broadcast time information.

However, in order to use the CS frame, negotiation must be performed between the transmitting MLD and the receiving MLD through a broadcast change sequence request frame and a broadcast change sequence response frame. For example, the first receiving STA transmits the broadcast change sequence request frame to the first transmitting STA, and the first receiving STA receives the broadcast change sequence response frame from the first transmitting STA. For example, the broadcast change sequence request frame includes information on the number of transmitted CS frames between transmissions of a beacon frame, information indicating whether the CS frame is transmitted periodically or aperiodically, and Link indicator information for a link through which the CS frame can be transmitted. In addition, the broadcast change sequence response frame may include status information indicating whether to 'Accept' or 'Denied' the request of the receiving STA, information on the number of CS frames scheduled between transmission of beacon frames, target beacon transmission time (TBTT) for which the CS frame is reserved Offset information with tolerance and information on the data rate of the CS frame.

Figure 43:
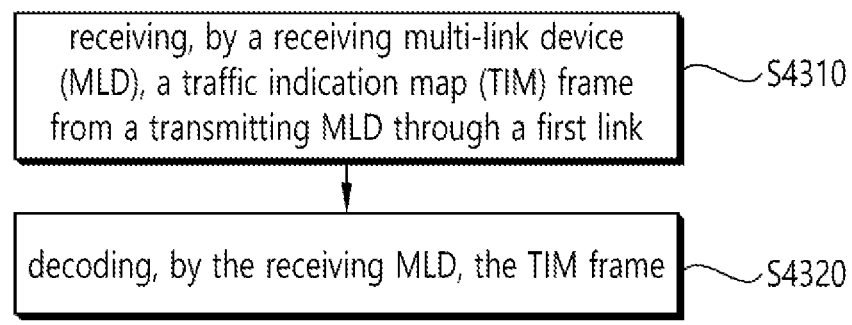
FIG. 43 is a flowchart illustrating a procedure in which a receiving MLD requests information of APs included in a transmitting MLD from a transmitting MLD based on a TIM frame according to the present embodiment.

FIG. 43 is a flowchart illustrating a procedure in which a receiving MLD requests information of APs included in a transmitting MLD from a transmitting MLD based on a TIM frame according to the present embodiment.

The example of FIG. 43 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for notifying whether a critical update of another AP in a transmitting MLD is based on a TIM frame in MLD communication. The transmission MLD may be an AP MLD, and the reception MLD may be a non-AP MLD.

In step S4310, a receiving multi-link device (MLD) receives a traffic indication map (TIM) frame from a transmitting MLD through a first link.

In step S4320, the receiving MLD decodes the TIM frame.

For example, the transmitting MLD includes a first transmitting station (STA) operating on the first link, a second transmitting STA operating on a second link and a third transmitting STA operating on a third link. The receiving MLD may include a first receiving STA operating on the first link. The receiving MLD may further include a second receiving STA operating on the second link and a third receiving STA operating on the third link.

The TIM frame includes a Check Beacon field and an MLD Change Sequence field. The check beacon field includes critical update information of the first transmitting STA. The MLD change sequence field includes critical update information of the second and third transmitting STAs.

That is, this embodiment proposes a method of notifying critical update information of an AP and other Aps connected in a transmitting MLD based on a previously defined TIM frame. The previously defined check beacon field in the TIM frame is used to inform critical update information of connected APs, and the newly defined MLD change sequence field is used to inform critical update information of other APs.

The receiving MLD may transmit a beacon frame from the transmitting MLD through the first link.

When a critical update occurs in a basic service set (BSS) of the second transmitting STA after the beacon frame is received and before the TIM frame is received, the TIM frame may include an updated change sequence value for the second link. The updated change sequence value for the second link may be a value increased by 1 from the change sequence value for the second link included in the beacon frame. The updated change sequence value for the second link may be included in critical update information of the second transmitting STA.

In addition, when a critical update occurs in the BSS of the third transmitting STA after the beacon frame is received and before the TIM frame is received, the TIM frame may include an updated change sequence value for the third link. The updated change sequence value for the third link may be a value increased by 1 from the change sequence value for the third link included in the beacon frame. The updated change sequence value for the third link may be included in critical update information of the third transmitting STA.

The receiving MLD may receive a next beacon frame from the transmitting MLD through the first link. The next beacon frame may be received after the TIM frame is received.

When the first receiving STA operates in a power saving mode and activates TIM broadcast, the first receiving STA may be awake based on a transmission period of the TIM frame. The transmission period of the TIM frame may be shorter than a transmission period of the beacon frame.

Since this embodiment assumes that the TIM broadcast is activated, the TIM frame may be transmitted periodically (every broadcast interval). In addition, since it is assumed that the receiving MLD operates in a power saving mode, the first receiving STA is awake according to the period of the TIM frame, and does not necessarily need to be awake to receive a beacon frame. Accordingly, when a critical update of another AP occurs after the beacon frame, the first receiving STA can receive critical update information of another AP through the TIM frame without receiving the next beacon frame. This has an effect of reducing overall frame overhead and performing efficient power saving.

Also, the TIM frame may further include broadcast time information. The broadcast time information may be information informing a time at which the critical update information of the second and third transmitting STAs will be transmitted. That is, the first receiving STA can know when critical update information of another AP is broadcast by checking the broadcast time information. When the first receiving STA operates in the power saving mode, it may wake up at the time specified in the broadcast time information. In addition, the first receiving STA may receive a (separate) notification frame from the transmitting MLD at the time specified in the broadcast time information to check critical update information of another AP.

The receiving MLD may further include a second receiving STA operating in the second link and a third receiving STA operating in the third link.

The TIM frame may further include link indicator information. The link indicator information may include identifier information of the first, second or third link. The critical update information of the first, second, or third transmitting STA may be included in the TIM frame based on the link indicator information.

Also, the receiving MLD may receive a Change Sequence (CS) frame from the transmitting MLD instead of the TIM frame through the first link. The CS frame may also include link indicator information, critical update information (change sequence value) of an AP in the transmitting MLD, and broadcast time information.

However, in order to use the CS frame, negotiation must be performed between the transmitting MLD and the receiving MLD through a broadcast change sequence request frame and a broadcast change sequence response frame. For example, the first receiving STA transmits the broadcast change sequence request frame to the first transmitting STA, and the first receiving STA receives the broadcast change sequence response frame from the first transmitting STA. For example, the broadcast change sequence request frame includes information on the number of transmitted CS frames between transmissions of a beacon frame, information indicating whether the CS frame is transmitted periodically or aperiodically, and Link indicator information for a link through which the CS frame can be transmitted. In addition, the broadcast change sequence response frame may include status information indicating whether to 'Accept' or 'Denied' the request of the receiving STA, information on the number of CS frames scheduled between transmission of beacon frames, target beacon transmission time (TBTT) for which the CS frame is reserved Offset information with tolerance and information on the data rate of the CS frame.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a Traffic Indication Map (TIM) frame from a transmission MLD through a first link; and decodes the TIM frame.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a Traffic Indication Map (TIM) frame from a transmission MLD through a first link; and decoding the TIM frame. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    receiving, by a first non-access point (non-AP) station (STA) affiliated with a non-AP multi-link device (MLD), a beacon frame from a first access point (AP) affiliated with an AP MLD:
    receiving, by the first non-AP STA, a traffic indication map (TIM) frame from the first AP; and
    decoding, by the first non-AP STA, the beacon frame and the TIM frame,
    wherein the first AP operating on a first link, a second AP operating on a second link, and a third AP operating on a third link are affiliated with the AP MLD,
    wherein the TIM frame includes a Check Beacon field and an MLD Change Sequence field,
    wherein the Check Beacon field includes critical update information of the first AP,
    wherein the MLD Change Sequence field includes critical update information of the second and third APs,
    wherein, the first non-AP STA operating in a power saving mode is awake based on a transmission period of the TIM frame, and
    wherein the transmission period of the TIM frame is shorter than a transmission period of the beacon frame.

2. The method of claim 1, wherein the first non-AP STA operating on the first link is affiliated with the non-AP MLD, wherein the TIM frame includes an updated change sequence value for the second link based on a critical update occurring in a basic service set (BSS) of the second AP after the beacon frame is received and before the TIM frame is received, and wherein the updated change sequence value for the second link is a value increased by 1 from a change sequence value for the second link included in the beacon frame.

3. The method of claim 2, wherein the updated change sequence value for the second link is included in the critical update information of the second AP.

4. The method of claim 2,
wherein the first non-AP STA does not necessarily need to be awake to receive a next beacon frame,
wherein the next beacon frame is transmitted after the TIM frame is received.

5. The method of claim 1, wherein the TIM frame further includes broadcast time information,
wherein the broadcast time information is information informing a time at which the critical update information of the second and third APs will be transmitted.

6. The method of claim 1, wherein the non-AP MLD further includes a second non-AP STA operating on the second link and a third non-AP STA operating on the third link,
wherein the TIM frame further includes link indicator information,
wherein the link indicator information includes identifier information of the first, second or third link, and
wherein the critical update information of the first, second or third APs is included in the TIM frame based on the link indicator information.

7. A non-access point (non-AP) Multi-link Device (MLD) in a wireless local area network (WLAN) system, the non-AP MLD comprising:
a memory;
a transceiver; and
a processor being operatively connected to the memory and the transceiver,
wherein the processor is configured to:
receive, by a first non-AP station (STA) affiliated with the non-AP MLD, a beacon frame from a first access point (AP) affiliated with an AP MLD;
receive, by the first non-AP STA, a traffic indication map (TIM) frame from, the first AP; and
decode, by the first non-AP STA, the beacon frame and the TIM frame,
wherein the first AP operating on a first link, a second AP operating on a second link and a third AP operating on a third link; are affiliated with the AP MLD,
wherein the TIM frame includes a Check Beacon field and an MLD Change Sequence field,
wherein the check beacon field includes critical update information of the first AP,
wherein the MLD change sequence field includes critical update information of the second and third APs,
wherein, the first non-AP STA operating in a power saving mode is awake based on a transmission period of the TIM frame, and
wherein the transmission period of the TIM frame is shorter than a transmission period of the beacon frame.

8. A method in a wireless local area network (WLAN) system, the method comprising:
configuring, by a first access point (AP) affiliated with an AP multi-link device (MLD), a beacon frame and a traffic indication map (TIM) frame;
transmitting, by the first AP, the beacon frame to a first non-access point (non-AP) station (STA) affiliated with a non-AP multi-link device (MLD),
transmitting, by the first AP, the TIM frame to the first non-AP STA,
wherein the first AP operating on a first link, a second AP operating on a second link, and a third AP operating on a third link are affiliated with the AP MLD
wherein the TIM frame includes a Check Beacon field and an MLD Change Sequence field,
wherein the check beacon field includes critical update information of the first AP,
wherein the MLD change sequence field includes critical update information of the second and third APs,
wherein, the first non-AP STA operating in a power saving mode is awake based on a transmission period of the TIM frame, and
wherein the transmission period of the TIM frame is shorter than a transmission period of the beacon frame.

9. The method of claim 8, wherein the first non-AP STA operating on the first link is affiliated with the non-AP MLD,
wherein the TIM frame includes an updated change sequence value for the second link based on a critical update occurring in a basic service set (BSS) of the second AP after the beacon frame is transmitted and before the TIM frame is transmitted, and
wherein the updated change sequence value for the second link is a value increased by 1 from a change sequence value for the second link included in the beacon frame.

10. The method of claim 9, wherein the updated change sequence value for the second link is included in the critical update information of the second AP.

11. The method of claim 9, wherein
the first non-AP STA does not necessarily need to be awake to receive a next beacon frame,
wherein the next beacon frame is transmitted after the TIM frame is received.

12. The method of claim 8, wherein the TIM frame further includes broadcast time information,
wherein the broadcast time information is information informing a time at which the critical update information of the second and third APs will be transmitted.

13. The method of claim 8, wherein the non-AP MLD further includes a second non-AP STA operating on the second link and a third non-AP STA operating on the third link,
wherein the TIM frame further includes link indicator information,
wherein the link indicator information includes identifier information of the first, second or third link, and
wherein the critical update information of the first, second or third APs is included in the TIM frame based on the link indicator information.

* * * * *